United States Patent
Parsons et al.

(10) Patent No.: US 10,427,078 B2
(45) Date of Patent: Oct. 1, 2019

(54) FILTER ELEMENT AND SUPPORT STRUCTURE

(71) Applicants: DONALDSON COMPANY, INC., Minneapolis, MN (US); IFIL.USA, LLC, Harrisonville, MO (US)

(72) Inventors: Jonathan G. Parsons, Lino Lakes, MN (US); Philip Edward Johnson, Apple Valley, MN (US); John K. Falk, III, Westwood, KS (US)

(73) Assignees: Donaldson Company, Inc., Minneapolis, MN (US); IFIL.USA, LLC, Harrisonville, MO (US)

(*) Notice: Subject to any disclaimer, the term of this patent is extended or adjusted under 35 U.S.C. 154(b) by 175 days.

(21) Appl. No.: 15/650,464

(22) Filed: Jul. 14, 2017

(65) Prior Publication Data

US 2018/0015402 A1    Jan. 18, 2018

Related U.S. Application Data

(60) Provisional application No. 62/363,007, filed on Jul. 15, 2016.

(51) Int. Cl.
*B01D 46/00* (2006.01)
*B01D 46/52* (2006.01)
*B01D 46/24* (2006.01)

(52) U.S. Cl.
CPC ....... *B01D 46/0005* (2013.01); *B01D 46/001* (2013.01); *B01D 46/2403* (2013.01); *B01D 46/521* (2013.01); *B01D 2275/207* (2013.01)

(58) Field of Classification Search
CPC .............. B01D 46/0005; B01D 46/001; B01D 46/2411; B01D 46/521; B01D 2265/06; B01D 46/2403; B01D 2275/207; B01D 2201/0415; B01D 2201/12; B01D 2201/127; B01D 27/06

See application file for complete search history.

(56) References Cited

U.S. PATENT DOCUMENTS 3,853,509 A   12/1974  Leliaert et al.
4,039,308 A    8/1977  Schiff et al.
(Continued)

FOREIGN PATENT DOCUMENTS

CA        1032088       5/1978
DE     102009053683     5/2011
(Continued)

*Primary Examiner* — Robert Clemente
(74) *Attorney, Agent, or Firm* — Mueting, Raasch & Gebhardt, P.A.

(57) ABSTRACT

The current technology relates to a filter element having pleated filter media. The pleated filter media defines an elongate tubular structure having an inner passageway. The pleated filter media has outer pleat folds and inner pleat folds each extending from a first end to a second end of the elongate tubular structure. The filter element has no more than one elongate brace disposed in the inner passageway, extending between the first end and the second end. A plurality of support ribs are coupled to the elongate brace, where each support rib has a connector defining an interference-fit with the elongate brace. Each support rib partially defines the inner passageway and has an outer support surface that abuts a substantial portion of the inner pleat folds.

20 Claims, 16 Drawing Sheets

(56) References Cited

U.S. PATENT DOCUMENTS

| | | |
|---|---|---|
| 4,058,379 A | 11/1977 | Cheng et al. |
| 4,171,963 A | 10/1979 | Federick |
| 4,276,065 A | 6/1981 | Miko et al. |
| 4,343,149 A | 8/1982 | Abthoff et al. |
| 4,390,354 A | 6/1983 | Witchell et al. |
| 4,477,270 A | 10/1984 | Tauch et al. |
| 4,529,514 A | 7/1985 | Gruett |
| 4,749,485 A | 6/1988 | Degraffenreid |
| 4,854,953 A | 8/1989 | Van Weerden et al. |
| 4,876,007 A | 10/1989 | Naruo et al. |
| 5,290,330 A | 3/1994 | Tepper et al. |
| 5,531,892 A | 7/1996 | Duffy et al. |
| 6,482,247 B2 | 11/2002 | Fallon et al. |
| 6,706,087 B1 | 3/2004 | Gebler et al. |
| 7,497,889 B2 | 3/2009 | Machida et al. |
| 7,520,392 B2 | 4/2009 | Schewitz et al. |
| 7,789,926 B2 | 9/2010 | Rieger et al. |
| 7,879,125 B2 | 2/2011 | Haberkamp et al. |
| 7,942,947 B2 | 5/2011 | Yamamoto et al. |
| 8,051,989 B1 | 11/2011 | Tondreau et al. |
| 8,080,159 B2 | 12/2011 | South et al. |
| 8,114,183 B2 | 2/2012 | Schwandt et al. |
| 8,167,141 B2 | 5/2012 | Saaski et al. |
| 8,617,404 B2 | 12/2013 | Knottnerus et al. |
| 8,936,662 B2 | 1/2015 | Buzanowski et al. |
| 9,028,702 B2 | 5/2015 | Marshall et al. |
| 2003/0213739 A1 | 11/2003 | Parker et al. |
| 2004/0238437 A1 | 12/2004 | Nguyen et al. |
| 2005/0145567 A1 | 7/2005 | Quintel et al. |
| 2006/0070945 A1 | 4/2006 | Men et al. |
| 2007/0119130 A1* | 5/2007 | Fliszar ............... B01D 46/0001 55/379 |
| 2007/0157808 A1 | 7/2007 | Wagner et al. |
| 2008/0272048 A1 | 11/2008 | Mei et al. |
| 2008/0282657 A1 | 11/2008 | Reamsnyder et al. |
| 2008/0302717 A1 | 12/2008 | Terry et al. |
| 2009/0200221 A1 | 8/2009 | Hacker et al. |
| 2011/0073551 A1 | 3/2011 | Reid et al. |
| 2012/0012518 A1 | 1/2012 | Mei et al. |
| 2012/0132582 A1 | 5/2012 | Glück et al. |
| 2012/0160755 A1 | 6/2012 | Lacroix et al. |
| 2013/0001148 A1 | 1/2013 | Osborne et al. |
| 2013/0228503 A1 | 9/2013 | Baumann et al. |
| 2015/0219049 A1 | 8/2015 | Allen et al. |

FOREIGN PATENT DOCUMENTS

| | | |
|---|---|---|
| DE | 202009018835 | 1/2014 |
| DE | 102013004865 | 9/2014 |
| DE | 102013004867 | 9/2014 |
| DE | 102014009324 | 12/2015 |
| EP | 2190554 | 1/2013 |
| EP | 2783738 | 10/2014 |

* cited by examiner

FILTER ELEMENT AND SUPPORT STRUCTURE

This application is a non-provisional application claiming priority to U.S. Provisional Application No. 62/363,007, filed Jul. 15, 2016, and the entire contents of which is incorporated herein by reference.

FIELD OF THE TECHNOLOGY

The technology disclosed herein relates generally to a filter element. More particularly, the technology disclosed herein relates to a filter element and a support structure.

SUMMARY

Some example embodiments relate to a filter element having pleated filter media. The pleated filter media defines an elongate tubular structure having an inner passageway. The pleated filter media has outer pleat folds and inner pleat folds each extending from a first end to a second end of the elongate tubular structure. The filter element has no more than one elongate brace disposed in the inner passageway, extending between the first end and the second end. A plurality of support ribs are coupled to the elongate brace, where each support rib has a connector defining an interference-fit with the elongate brace. Each support rib partially defines the inner passageway and has an outer support surface that abuts a substantial portion of the inner pleat folds.

Some example embodiments relate to a method. No more than one elongate brace is obtained. A plurality of support ribs are formed, where the support ribs each have an outer support surface. Each of the support ribs are coupled to the elongate brace via an interference fit at incremental intervals along the length of the elongate brace. Pleated filter media is wrapped around the support ribs to form an elongate tubular structure extending from a first end to a second end and defining an inner passageway.

Some example embodiments relate to a fluid filter assembly. The fluid filter assembly has a first pleated filter media defining a first tubular structure having a first inner passageway extending from a first end to a second end of the first pleated filter media to define a first media length. The first pleated filter media has outer pleat folds and inner pleat folds each extending from the first end to the second end of the first pleated filter media. A first inner support structure is disposed in the first inner passageway, where the first inner support structure has no more than one elongate brace and a first plurality of support ribs coupled to the elongate brace. The elongate brace extends between the first end and the second end of the first pleated filter media. Each of the first plurality of support ribs has a connector defining an interference-fit with the elongate brace and a first outer support surface abutting a substantial portion of the inner pleat folds of the first pleated filter media.

The fluid filter assembly also has a second pleated filter media defining a second tubular structure having a second inner passageway extending from a first end to a second end of the second pleated filter media to define a second media length. The second pleated filter media has outer pleat folds and inner pleat folds each extending from the first end to the second end of the second pleated filter media. A second inner support structure is disposed in the second inner passageway, where the second inner support structure has no more than one elongate brace and a second plurality of support ribs coupled to the elongate brace. The elongate brace extends between the second end and the second end of the second pleated filter media. Each of the second plurality of support ribs has a connector defining an interference-fit with the elongate brace and a second outer support surface abutting a substantial portion of the inner pleat folds of the second pleated filter media.

The fluid filter assembly has a first end cap coupled to the first end of the first pleated filter media and the first end of the second pleated filter media and a second end cap coupled to the second end of the first pleated filter media and the second end of the second pleated filter media. Other embodiments are described herein.

BRIEF DESCRIPTION OF THE DRAWINGS

The current technology may be more completely understood and appreciated in consideration of the following detailed description of various embodiments of the current technology in connection with the accompanying drawings.

DETAILED DESCRIPTION

Figure 1:
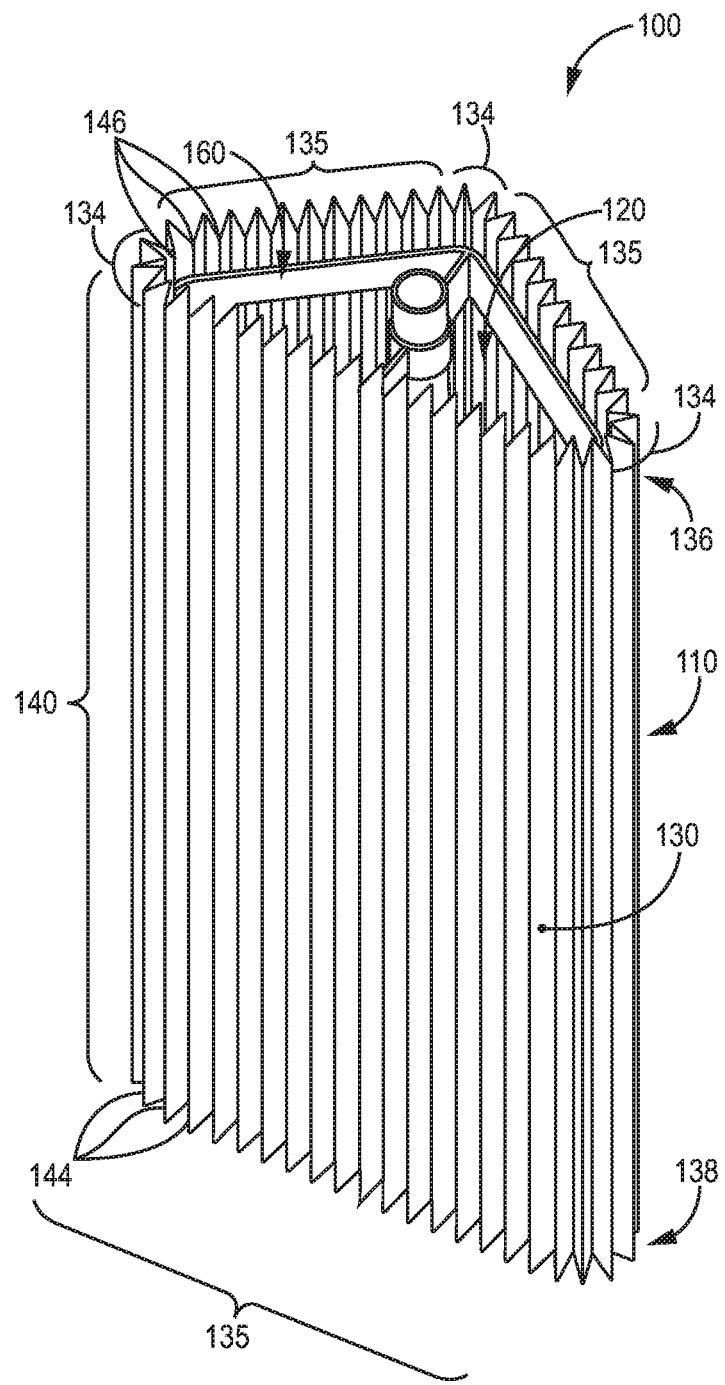
FIG. 1 is a perspective view of an example filter element consistent with the technology disclosed herein.

FIG. 1 depicts an example filter element 100. The filter element 100 generally has a pleated filter media 130 defining an elongate tubular structure 110 and an inner passageway 120. An inner support structure 160 is disposed within the inner passageway 120.

The elongate tubular structure 110 generally has a first end 136 and a second end 138. A media length 140 is defined from the first end 136 to the second end 138. In some embodiments, the inner passageway 120 extends from the first end 136 to the second end 138 of the elongate tubular structure 110.

The pleated filter media 130 generally defines outer pleat folds 144 and inner pleat folds 146. The outer pleat folds 144 are generally adjacent the environment outside of the elongate tubular structure 110 and the inner pleat folds 146 are generally adjacent the inner passageway 120 of the elongate tubular structure 110. The inner pleat folds 146 and outer pleat folds 144 each generally extend along the media length 140. In some embodiments, the outer pleat folds 144 and the inner pleat folds 146 each extend from the first end 136 to the second end 138 of the elongate tubular structure 110.

In the current example, the pleated filter media 130 defines three corners 134 and three faces 135. Despite having pleats, each face can be characterized as generally planar, where the term "planar" as used herein encompasses relatively flat planes and substantially curved planes. The phrase "substantially curved plane" is used herein to encompass actually curved planes but also configurations where there are a plurality of adjacent flat planes to form facets that approximate a curved plane. An example face forming a substantially curved plane will be referenced in more detail in the discussion of FIG. 9. The three corners 134 and the three faces 135 define a generally triangular shape of the pleated filter media 130 in a cross section perpendicular to the length of the media, which will be described in more detail with reference to FIG. 4A. A "corner" is generally defined herein as a region of intersection of at least two faces of the pleated filter media 130. The region can define an edge or a substantially curved plane, and in the current example each corner 134 is a substantially curved plane. The corners 134 of the pleated filter media 130 extend from the first end 136 to the second end 138 of the elongate tubular structure 110.

The filter element 100 is generally configured for fluid filtration. In some implementations, the filter element 100 can be configured for liquid filtration. In some implementations, the filter element 100 can be configured for gas filtration. The pleated filter media 130 can be constructed with a variety of materials suitable for the intended use of the filter element 100. The pleated filter media 130 can be constructed of one or more media layers of filtration material. The pleated filter media 130 can be manufactured from a variety of medias which can include non-woven media or fabric and membranes constructed from organic, synthetic, or a mixture of organic and synthetic medias. In some embodiments, cellulose, glass, polyester (PE), polypropylene, polytetrafluoroethylene (PTFE), or expanded PTFE (ePTFE) are utilized in the pleated filter media 130. The pleated filter media 130 can be constructed of nanofiber, such as that created by Donaldson Company, Inc. of Bloomington, Minn. In some embodiments, the pleated filter media 130 can be constructed of a cellulose media having one or more layers of nanofiber. In some embodiments, the pleated filter media 130 comprises activated carbon. The pleated filter media 130 can have layers co-pleated or bonded with melt-blown carbon media. The pleated filter media 130 can be constructed of a self-supporting media. The pleated filter media 130 can include a media supported on one or both sides. A pleated filter media 130 can have a wire backing on one or both sides, for example.

The pleated filter media 130 could also include a coating for enhanced filtration, chemical resistance, electrical properties and microbial growth. Additionally, the pleated filter media 130 can have any number of treatments to improve its efficiency in removing particulates and for other purposes. For example, electrostatically treated media can be used. The pleated filter media 130 can also be treated with anti-microbial substances to prevent the growth of mold on the filters. Anti-viral or anti-mycotic agents may also be used to treat the pleated filter media 130 to reduce the populations of infectious agents.

The pleated filter media 130 is generally formed by pleating a filtration media. The pleats are generally defined between the inner pleat folds 146 and the outer pleat folds 144. Various methods of pleating a filtration media into a pleated filter media 130 are contemplated. In some embodiments, the pleated filter media 130 is pleated using a blade pleater. The pleat height and frequency (number of pleats per unit of length) are not particularly limited. Pleat spacing is selected such that pleats are not so close as to close off effective media area under load and not so spaced as to underutilize potential effective media area. Effective pleat spacing can vary with the type of media and pleat height. In some embodiments, a substantial portion (i.e. at least 90%) of the pleats in the pleated filter media 130 have substantially equal pleat heights, which will be described in more detail with reference to FIG. 4A. Various cross-sectional shapes of the individual pleats are contemplated, such a triangle, rectangle, and the like. Pleated media can provide a relative increase to the filtration surface area of a filter assembly when compared to unpleated media.

As mentioned above, the filter element 100 can be used for a variety of fluid filtration applications. The filter element 100 can be configured for inside-out or outside-in fluid flow. In some implementations, the filter element 100 can be configured for liquid filtration. In some liquid filtration implementations, the filter element 100 is configured for inside-out flow. In some liquid filtration implementations, the filter element 100 is configured for outside-in flow. Examples of liquid filtration include water filtration, fuel filtration, and the like. In some implementations, the filter element 100 can be configured for gas filtration. In some gas filtration implementations, the filter element 100 is configured for outside-in flow. In some gas filtration implementations, the filter element 100 is configured for inside-out flow. Examples of gas filtration include air filtration and filtration of other gases.

The filter element 100 can be configured to receive end caps to direct fluid flow through the pleated filter media 130. The filter element 100 can be configured to receive a first end cap (not shown) on the first end 136. In such embodiments, the first end cap can be configured to couple to the first end 136 of the pleated filter media 130. The first end cap can define an opening in communication with the inner passageway 120. The filter element 100 can be configured to receive a second end cap (not shown) on the second end 138. In such embodiments, the second end cap can be configured to couple to the second end 138 of the pleated filter media 130. The second end cap can be configured to form a barrier across the inner passageway. Example end caps will be described in more detail below with reference to FIGS. 6 and 7.

The inner support structure 160 of the filter element 100 is generally a rigid structure configured to provide structural support to the pleated filter media 130. In some embodiments, the inner support structure 160 is configured to provide a structure onto which the pleated filter media 130 can be disposed during manufacture. In some embodiments, the inner support structure 160 is configured to prevent the pleated filter media 130 from collapsing during fluid filtration. In various embodiments, the inner support structure 160 defines a shape to which the pleated filter media 130 conforms. The inner support structure 160 at least partially defines the inner passageway 120. In some examples, the inner support structure 160 maintains the triangular cross-sectional shape of the pleated filter media 130.

Figure 2:
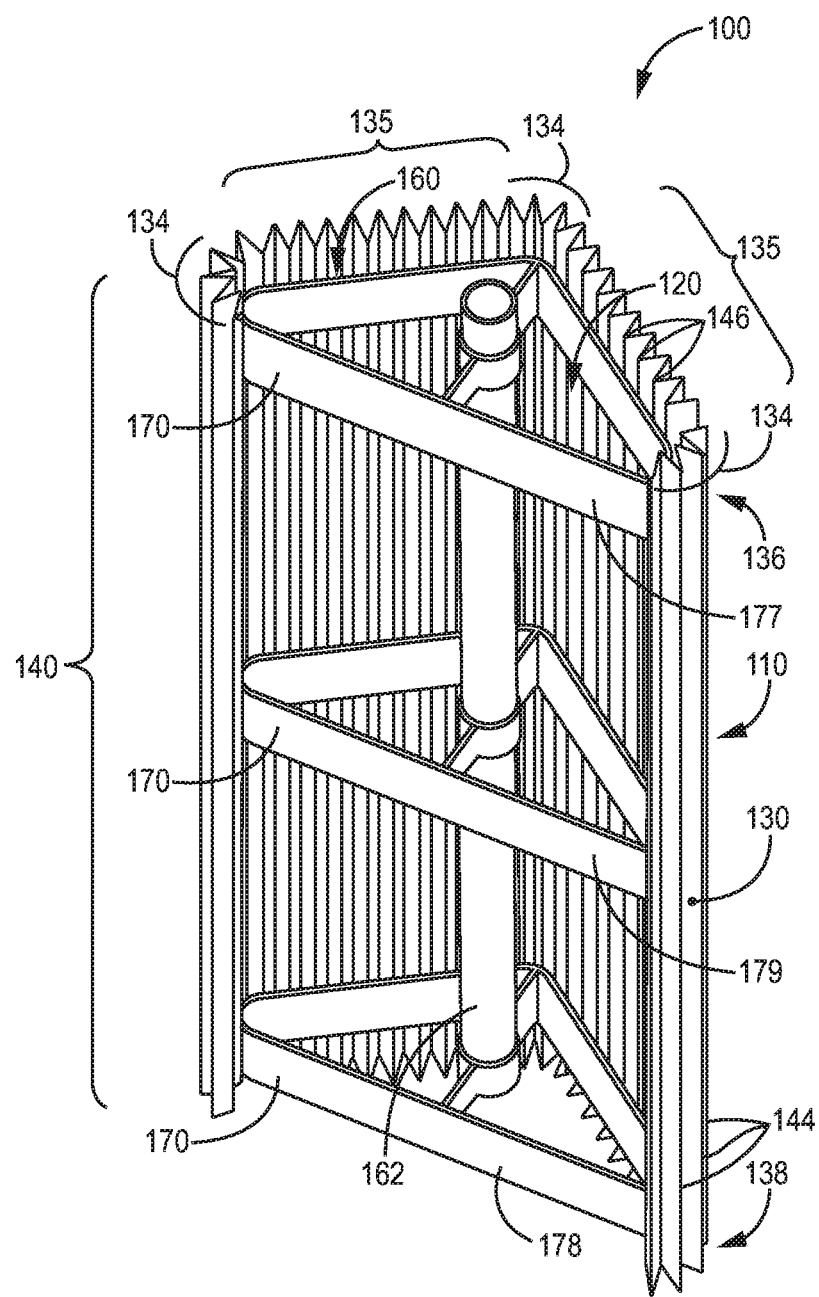
FIG. 2 is a cutaway view of the filter element of FIG. 1.
Figure 3:
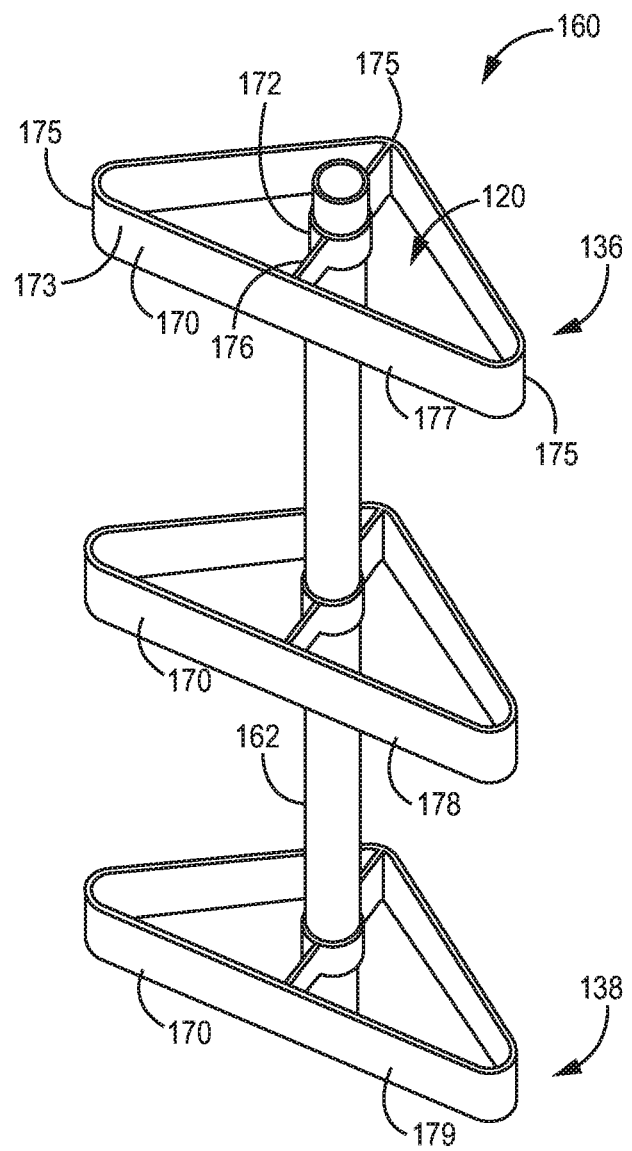
FIG. 3 is an inner support structure of the filter element of FIG. 1.

FIG. 2 is a cutaway view of the filter element 100 depicted in FIG. 1. A portion of the pleated filter media 130 is removed to view the inner support structure 160. FIG. 3 is a perspective view of the inner support structure 160 of the filter element 100 with no filter media. The inner support structure 160 has an elongate brace 162. The inner support structure 160 has a plurality of support ribs 170 coupled to the elongate brace 162.

The elongate brace 162 is generally configured to provide structural support to the pleated filter media 130 and plurality of support ribs 170. The elongate brace 162 is generally an elongate structure configured to receive each of the plurality of support ribs 170 to form the inner support structure 160.

Inner support structures consistent with the technology disclosed herein generally have no more than one elongate brace 162. The elongate brace 162 can have a geometry that is universal to different filter elements. By way of example, filter elements of differing configurations can incorporate elongate braces of differing or similar lengths but otherwise like geometry. The elongate brace 162 is disposed in the inner passageway 120 of the filter element 100. Generally, the elongate brace 162 extends between the first end 136 and the second end 138 of the pleated filter media 130. In some embodiments, the elongate brace 162 extends from the first end 136 towards the second end 138. In some such embodiments, the elongate brace 162 extends from the first end 136 to the second end 138 of the pleated filter media 130.

The elongate brace 162 can be a tube, rod, or other elongate structure. The elongate brace 162 can be constructed of a variety of materials. The elongate brace 162 can be constructed of plastics, metals, woods, ceramics, composites, and the like. The elongate brace 162 can be pervious or impervious to the fluid sought to be filtered. In some embodiments the elongate brace 162 is constructed of a mesh material, and in other embodiments the elongate brace 162 is constructed of a solid material. In some embodiments, the elongate brace 162 is constructed by forming a tubular structure from a plastic mesh material. In some embodiments, the elongate brace 162 is constructed by injection molding a tubular structure. In other embodiments, the elongate brace 162 is constructed by extruding a plastic or metal. The elongate brace 162 can be otherwise molded, cast, machined or manufactured.

The elongate brace 162 generally has a construction that provides adequate stiffness and strength to support the pleated filter media 130 during the manufacturing process. The elongate brace 162 can have a variety of cross-sectional shapes in a direction perpendicular to the length of the elongate brace 162. In some embodiments, the elongate brace 162 has a circular cross section. The elongate brace can also have a triangular, quadrilateral, or other polygonal cross section. In some embodiments, the elongate brace can have an irregularly shaped cross section. The elongate brace 162 is generally characterized by a geometry with which the support ribs 170 of the inner support structure 160 can couple. For example, the circular cross section of the elongate brace 162 of the current example is configured to mate with the structure of each of the plurality of support ribs 170.

The support ribs 170 are configured to provide structural support to the elongate tubular structure 110 of the pleated filter media 130. The plurality of support ribs 170 generally defines and maintains the shape of the pleated filter media 130. Each of the support ribs 170 generally has a connector 172, a cross-brace 176, and an outer support surface 173.

The support ribs 170 are configured to be disposed in the inner passageway 120 of the pleated filter media 130. The support ribs 170 at least partially define the inner passageway 120. The support ribs 170 are positioned axially along the length of the elongate brace 162. The plurality of support ribs 170 are generally positioned with a like orientation. In some embodiments, each of the plurality of support ribs 170 defines a like shape. In some embodiments, some or all of the plurality of support ribs 170 are identical. Embodiments in which the support ribs 170 each define a like or identical shape provide incremental support to maintain the shape of the pleated filter media 130 along the length of the pleated filter media 130.

The support ribs 170 can be coupled to the elongate brace 162 at regular or irregular incremental intervals along the length of the elongate brace 162. The interval or spacing between the support ribs 170 is generally such that the shape of the pleated filter media 130 is adequately supported during manufacturing and/or filtration. For example, the spacing of the support ribs 170 can be adjusted to appropriately support the pleated filter media 130 for a given fluid sought to be filtered, fluid flow rate, the type of pleated filter media 130, and other factors. In various embodiments, the support ribs 170 provide a sufficiently rigid structure to form the pleated filter media 130 there-around during manufacturing.

The inner support structure 160 generally has a quantity of support ribs 170 suitable to provide a desired interval between support ribs 170 for a filter element 100 of a given length. In some embodiments, the inner support structure 160 has two or more support ribs 170. In some embodiments, the plurality of support ribs 170 is at least a first support rib 177 disposed towards the first end 136 of the elongate tubular structure 110, a second support rib 178 disposed towards the second end 138 of the elongate tubular structure 110, and a third support rib 179 disposed between the first support rib 177 and the second support rib 178. The number of support ribs 170 of the inner support structure 160 is not particularly limited.

The support rib 170 can be constructed of plastics, metals, woods, ceramics, composites, and the like. The support rib 170 can more particularly be constructed of polypropylene, polyvinylchloride (PVC), polyethylene, polyethylene terephthalate (PET), acrylonitrile butadiene styrene (ABS), nylon, and the like. The support rib 170 can be pervious or impervious to the fluid sought to be filtered. In some embodiments, the support rib 170 is constructed by injection molding. In other embodiments, the support rib 170 is constructed by extrusion. The support rib 170 can be otherwise molded, cast, machined or manufactured.

The outer support surface 173 is an outer surface of each support rib 170 configured structurally support the pleated filter media 130. In some embodiments, the outer support surface 173 defines two or more corners 175 and particularly three corners 175 in examples consistent with the current embodiment. The outer support surface 173 is generally configured to be disposed within the inner passageway 120 of the pleated filter media 130. In some embodiments, the outer support surface 173 abuts a substantial portion of the inner pleat folds 146 of the pleated filter media 130, where the phrase "substantial portion" is defined herein as at least 90%. The pleated filter media 130 generally conforms to the shape of the outer support surface 173. Specifically, the outer support surface 173 of the support rib 170 abuts the inner pleat folds 146 around each corner 175.

The outer support surface 173 can be configured to minimally inhibit flow through the pleated filter media 130. For example, in the current embodiment, each support rib 170 mutually defines the inner passageway 120. The outer support surface 173 of each support rib 170 can be a solid portion of material. In some embodiments, the outer support surface 173 is a fluid impermeable region of material. In other embodiments, at least some portions of the outer support surface 173 can define a fluid permeable region such as a mesh structure.

The connector 172 of each support rib 170 is configured to couple with the elongate brace 162. The connector 172 generally provides the facility to couple each of the plurality of support ribs 170 at the desired incremental intervals along the length of the elongate brace 162. The connector 172 is configured to couple to the elongate brace 162 at any location along the length of the elongate brace 162. In other embodiments, the connector 172 is configured to couple with specific segments or receptacles defined along the length of the elongate brace 162. In some embodiments, the connector 172 is configured to permanently couple with the elongate brace 162. In other embodiments, the connector 172 is configured to removably couple with the elongate brace 162. For example, the connector 172 can define an interference-fit with the elongate brace 162. The interference-fit defined by the connector 172 is a geometry that frictionally engages the elongate brace 162.

The connector 172 can facilitate a tool-less connection between the elongate brace 162 and the of support rib 170. In some examples, the connector 172 of each support rib 170 can be manually snapped into place on the elongate brace 162. The connector 172 can be resilient such that it can expand under tension to receive the outer surface of the elongate brace 162 and relax absent application of tension to exert compressive force on the outer surface of the elongate brace 162, which can maintain the position of the support rib 170 on the elongate brace 162.

Other types of connectors 172 are possible. The connector 172 could also be configured to couple to the elongate brace 162 using a fastener or clamp. In some examples, the connector 172 can be an adhesive substrate with which the elongate brace 162 is adhered. An adhesive can be used alone or in combination with any contemplated connector 172. For example, an interference fit may be augmented by adhering an inner surface of the connector 172 to an outer surface of the elongate brace 162. Adhering can include the use of glues, cements, chemical adhesives, hot-melt adhesives, and other adhesives. The connector 172 can also be a substrate to which the elongate brace 162 is welded or otherwise bonded.

The cross-brace 176 of the support rib 170 is configured to provide structural support to the outer support surface 173 of the support rib 170. The cross-brace 176 bridges a gap between the connector 172 and an outer surface of the support rib 170. In some embodiments, the connector 172 defines a portion of the cross-brace 176. In some embodiments, the cross-brace 176 extends between the connector 172 and the outer support surface 173 of the support rib 170. In some embodiments, the cross-brace 176 is surrounded by the outer support surface 173.

The support ribs 170 generally simplify the manufacturing process of a filter element 100. In many existing designs, a single, often complex support structure is created as a single piece; such a support structure is only compatible with certain filters. The support ribs 170 can be a shape that is relatively simple to manufacture, and similarly, the elongate brace 162 can be relatively simple to manufacture. As such, an inner support structure 160 having a relatively complex structure can be easily constructed using such components. The support ribs 170 allow a modular support structure construction and can be used in differing quantities, depending on the particular filter element desired. For example, two filter elements having similar cross-sectional geometries but differing lengths can each be constructed using the same support ribs and the same elongate braces that are cut to a different length. Also, an elongate brace 162 can accommodate support ribs of different shapes for use in filter elements having differing configurations as long as each of the support ribs defines connector that is configured to couple to the elongate brace 162.

The pleated filter media 130 is generally disposed around the inner support structure 160 to form the elongate tubular structure 100 as has been described. The elongate tubular structure 110 can be formed by wrapping the pleated filter media 130 around the inner support structure 160. In some embodiments, a length of pleated filter media 130 is wrapped around the inner support structure 160 and the pleated filter media 130 is joined to itself along a seam (not shown) to form a loop. The pleated filter media 130 can be joined to itself along the seam with an adhesive, stitches, staples, welds, and the like. The pleated filter media 130 can be retained on the inner support structure 160 by friction, adhesion, and the like. In some embodiments, one or more end caps at the first end 136 and/or second end 138 of the pleated filter media 130 can retain the pleated filter media 130 on the inner support structure 160.

Figure 4A:
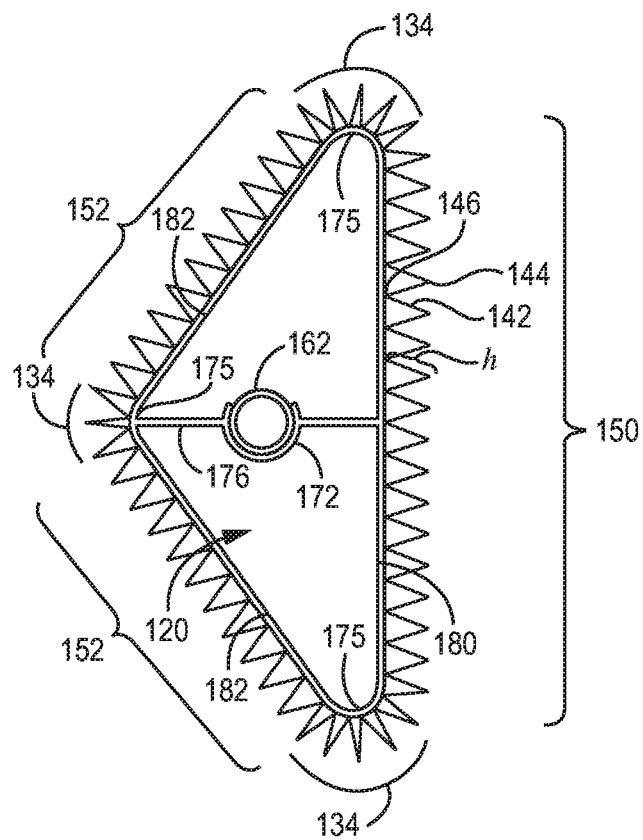
FIG. 4A is a cross-sectional view of the filter element of FIG. 1.

FIG. 4A is a cross-sectional view of the filter element 100 of FIG. 1, where the cross section is viewed from a direction perpendicular to the length of the pleated filter media 130. As laid out above with reference to FIGS. 2 and 3, the pleated filter media 130 is disposed around the inner support structure 160, and is supported by the outer support surface 173 of the support rib 170 of the inner support structure 160. The support rib 170 of the inner support structure at least partially defines the inner passageway 120.

The pleated filter media 130 defines pleats 142 between outer pleat folds 144 and inner pleat folds 146. The outer support surface 173 of each of the plurality of support ribs 170 generally abuts the inner pleat folds 146 of the pleated filter media 130 at least around each corner 134. The pleats 142 generally extend along the media length 140 (see FIG. 1, for example). In the current example, the pleats 142 of the pleated filter media 130 are characterized by pleat heights h. In some embodiments, the pleats 142 of the pleated filter media 130 have pleat heights that are substantially equal. The "pleat height" as used herein is the shortest distance along the media between an inner pleat fold 146 and an adjacent outer pleat fold 144 of the pleated filter media 130. The shortest distance between each adjacent pleat fold is generally constant along the length of each of the pleats 142. In some embodiments, pleats 142 having "substantially equal" pleat heights are defined as pleats having pleat heights within 10% of the average pleat height of the pleats in the pleated filter media 130.

The cross section of pleated filter media 130 defines two or more corners 134. In examples consistent with the current embodiment, the pleated filter media 130 defines three corners 134. The corners 134 defined by the pleated filter media 130 abut corresponding corners 175 of each of the plurality of support ribs 170. Various embodiments of the filter element 100 define elongate tubular structures 110 defining three corners 134 joined by faces 135 (see FIGS. 1 and 2) to form a triangular cross-sectional shape in a direction perpendicular to the length of the pleated filter media 130. In some embodiments, the cross section of the pleated filter media 130 perpendicular to the media length defines a triangle, wherein the triangle has one longest side 150 having a length that is greater than the length of each of the other two sides 152. In other words, the triangle formed by the faces 135 (see FIGS. 1 and 2) defines a longest side 150 and two minor sides 152. The two minor sides 152 are shorter than the longest side 150. In this particular example, the minor sides 152 have the same length. In this example, the pleated filter media 130 has a cross-sectional shape that is an isosceles triangle.

The pleated filter media 130 can define other cross-sectional shapes as well, such as other triangular cross-sectional shapes or even other polygonal shapes. It should be understood that the reference herein to triangular and other polygonal cross-sectional shapes of the pleated filter media encompasses shapes having rounded corners. In some embodiments, the cross-sectional shape of the pleated filter media 130 is a right triangle. In some embodiments, the cross-sectional shape of the pleated filter media 130 is not an equilateral triangle. In some embodiments, the cross-sectional shape of the pleated filter media 130 is a scalene triangle.

In some embodiments, the elongate brace 162 has a circular cross section in a direction that is perpendicular to the length of the pleated filter media 130, and the connector 172 of each support rib 170 has an inner arcuate geometry with a diameter smaller than or approximately equal to the diameter of the elongate brace 162 such that the connector 172 exerts compressive force on the outer surface of the elongate brace 162. In such embodiments, the friction between the connector 172 and the elongate brace 162 couples the two components. Other examples are possible wherein the connector 172 has a structure that is configured to receive the outer surface of the elongate brace 162. For example, the elongate brace can have alternate cross-sectional shapes and the connector can have a corresponding shape configured to couple to the elongate brace. Many possible connector geometries are contemplated that provide an interference fit between the connector 172 and the elongate brace 162. By way of example, the connector 172 can have a polygonal or elliptical cross sectional shape.

Figure 4B:
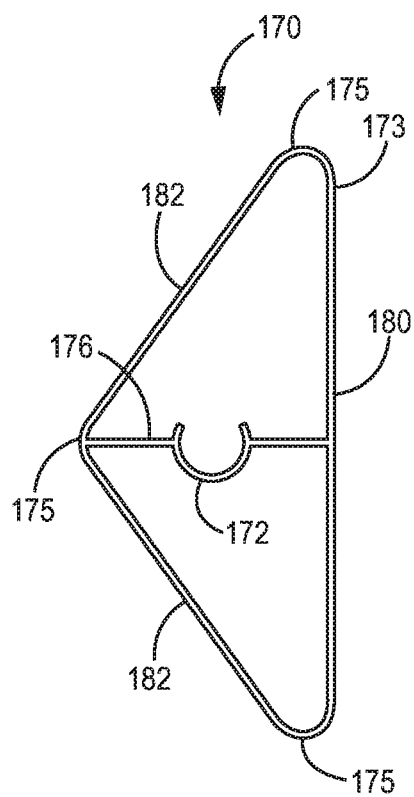
FIG. 4B is a cross-sectional view of a support rib of the filter element of FIG. 1.
Figure 4C:
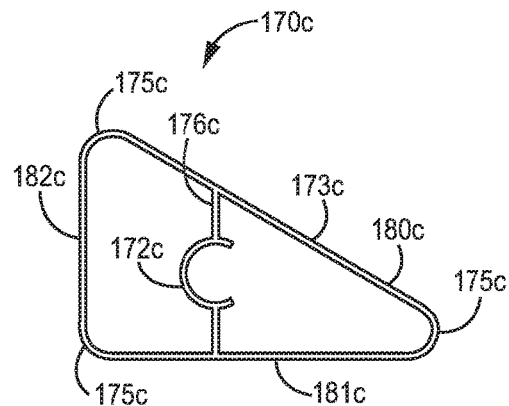
FIG. 4C is a cross-sectional view of a support rib consistent with the technology disclosed herein.
Figure 4D:
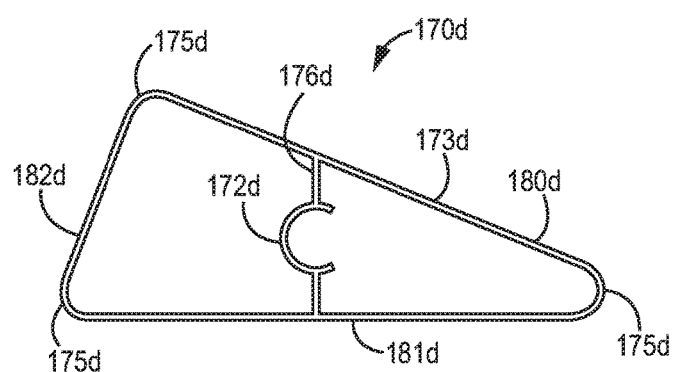
FIG. 4D is a cross-sectional view of a support rib consistent with the technology disclosed herein.

FIGS. 4B-4D depict cross-sectional views of example support rib geometries. The support ribs depicted in FIGS. 4B-4D each have outer support surfaces having cross-sectional shapes that are generally triangular. FIG. 4B depicts the support rib 170 of FIG. 4A having a cross section that is an isosceles triangle. FIG. 4C depicts an example support rib 170*c* having a cross section that is a right triangle. FIG. 4D depicts a support rib 170*d* having a cross section that is a scalene triangle.

FIG. 4B is a cross-sectional view of the example support rib 170 of the filter element 100 of FIGS. 2-4A. The support rib 170 generally has an outer support surface 173, a cross-brace 176, and a connector 172, as described above with reference to FIGS. 2 and 3. In this particular example the outer support surface 173 of the support rib 170 has a cross-sectional shape that is an isosceles triangle. The triangular cross section of the outer support surface 173 is defined by at least two corners 175, in particular three corners 175. The three corners 175 of the support rib 170 are defined by the intersections of three substantially linear segments 180, 182 corresponding to the faces 135 (see FIGS. 1-2) of the filter element 100. The corners 175 are rounded. In this example, the corners 175 are defined by the intersections of a longest side 180 and two minor sides 182.

FIG. 4C is a cross-sectional view of another example support rib 170*c*. The support rib 170*c* has an alternative geometry to the support rib 170 (FIG. 4B), but is otherwise consistent with the function of the support rib 170 as described above with reference to FIGS. 2-4B. The support rib 170*c* has a connector 172*c*, a cross-brace 176*c*, and an outer support surface 173*c*. The outer support surface 173*c* defines a hypotenuse side 180*c*, a base side 181*c*, and a height side 182*c* that each correspond to a face of a filter element. The intersections of the hypotenuse side 180*c*, the base side 181*c*, and the height side 182*c* define at least two corners 175*c*, in particular three corners 175*c* that are rounded. The outer support surface 173*c* has a cross-sectional shape that is a right triangle. In this example, the base side 181*c* and the height side 182*c* intersect at a right angle, and the hypotenuse side 180*c* defines a hypotenuse extending from the base side 181*c* to the height side 182*c*.

FIG. 4D is a cross-sectional view of an example support rib 170*d*. The example support rib 170*d* has an alternative geometry to the previously-described support ribs, but is otherwise consistent with the function of the support rib 170 as described above with reference to FIGS. 2-4B. The support rib 170*d* has a connector 172*d*, a cross-brace 176*d*, and an outer support surface 173*d*. The outer support surface 173 generally defines three sides 180*d*, 181*d*, 182*d*. The outer support surface 173*d* defines a major side (or the longest side) 180*d*, a base side 181*d*, and a height side 182*d*. The intersections of the major side 180*d*, the base side 181*d*, and the height side 182*d* define three corners 175*d*. The outer support surface 173*d* has a cross-sectional shape that is a scalene triangle. In this example, each of the base side 181*d*, the height side 182*d*, and the major side 180*d*—that each correspond to a face of the filter element—have different lengths.

Figure 4E:
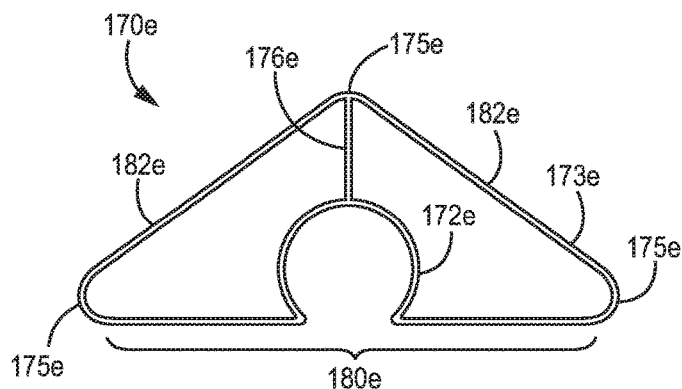
FIG. 4E is a cross-sectional view of a support rib consistent with the technology disclosed herein.

FIG. 4E depicts a cross-sectional view of an alternate example support rib 170*e*. The support rib 170*e* has an alternative geometry to the previously described support ribs, but is otherwise consistent with the function of the support rib 170 as described above with reference to FIGS. 2-4B. The support rib 170*e* has an outer support surface 173*e*, a cross-brace 176*e*, and a connector 172*e*. In this particular example the outer support surface 173*e* of the support rib 170*e* has a cross-sectional shape that is an isosceles triangle. The triangular cross section of the outer support surface 173*e* is defined by the three corners 175*e*. The three corners 175*e* of the support rib 170*e* are defined by the intersection of substantially linear segments 180*e*, 182*e* corresponding to faces of a filter element. In this example, the corners 175 are defined by the intersections of a major side, or longest side, 180*e* and the two minor sides 182*e*.

Contrary to the previously described support ribs, here the connector 172*e* is defined by a recess in the outer support surface 173*e*. The major side 180*e* of the triangular cross section of the outer support surface 173*e* is discontinuous as the recess defining the connector 172*e* is located at the major side 180*e*. As such, the connector 172*e* is not completely surrounded by the outer support surface 173*e* of the support rib 170*e*; rather, the connector 172*e* is partially surrounded by the outer support surface 173*e*. Similarly, the cross-brace 176*e* is not completely surrounded by the outer support surface 173e of the support rib 170e as was shown in FIG. 4B; rather, the cross-brace 176e is partially surrounded by the outer support surface 173e and partially surrounded by the connector 172e. However, the cross-brace 176e is surrounded by an outer surface of the support rib defined by the outer support surface 173e and the connector 172e. The connector 172e partially defines the cross-brace 176e. Similar to embodiments previously described, the outer support surface 173e of the support rib 170e can still be described as being configured to abut inner pleat folds of pleated filter media around each corner 175e. Also, the outer support surface 173e of the support rib 170e is configured to abut a substantial portion of the inner pleats folds of the pleated filter media.

A connector defined by a recess in a discontinuous outer support surface as described with reference to FIG. 4E can also be applied to the support ribs described above with reference to FIGS. 4B-4D and also support ribs described later herein. The connector configuration described here can be incorporated in other support rib constructions, such as those depicted in FIGS. 4B-4D.

The example support ribs of FIGS. 4C-4E can be incorporated in filter elements generally consistent with those described with reference to FIG. 1. In such embodiments, the inner pleat folds of pleated filter media will generally abut the respective outer support surfaces of the particular support rib employed, such that the pleated filter media defines a respective triangular cross section perpendicular to the length of the pleated filter media 130.

Figure 5:
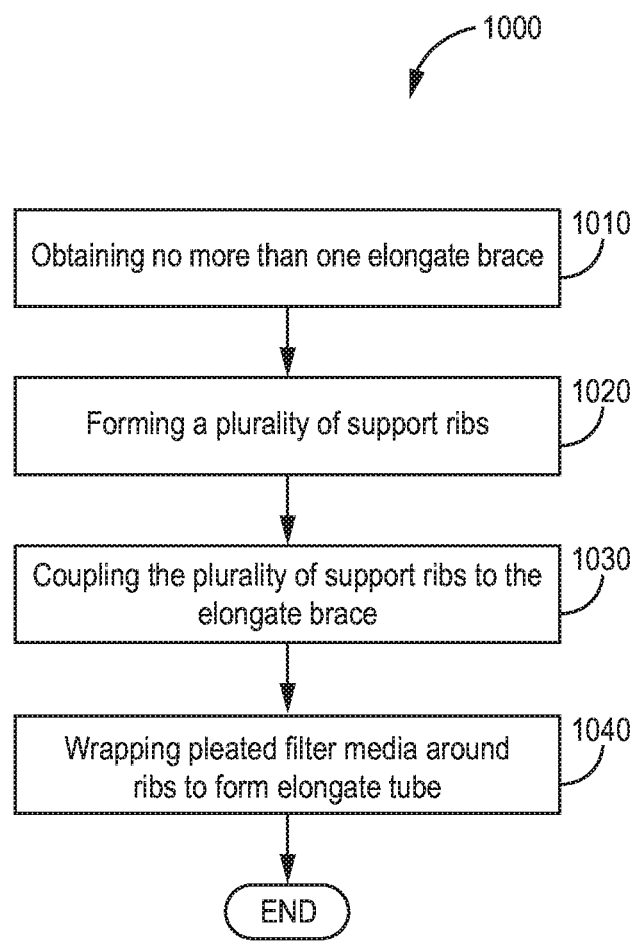
FIG. 5 is a flow chart of an example method of forming a filter element consistent with the technology disclosed herein.

FIG. 5 is a flowchart outlining an example method of forming a filter element 1000. The method 1000 can be used to produce a filter element having an inner support structure and pleated filter media wrapped around the inner support structure. The method of forming a filter element 1000 can be used to construct a filter element consistent with the filter elements described above with reference to FIGS. 1-4E, but also those that will be discussed further in this specification.

No more than one elongate brace is obtained 1010. A plurality of support ribs are formed 1020. Each of the plurality of support ribs are coupled to the elongate brace 1030. Pleated filter media is wrapped around the support ribs 1040.

The elongate brace that is obtained can have a function and structure consistent with the elongate braces described above with reference to FIGS. 2-4A. The elongate brace can also be constructed of materials consistent with those described above. In some embodiments, an elongate brace is obtained by forming a tubular structure from a plastic mesh material, or formed through other approaches described earlier herein.

The plurality of support ribs are formed 1020 to have a function and structure consistent with the support ribs described above with reference to FIGS. 2-4E. The formed plurality of support ribs can also be constructed of materials consistent with those described above. In some embodiments, forming a plurality of support ribs 1020 includes forming an outer support surface on each support rib. In some embodiments, forming a plurality of support ribs 1020 includes forming a cross-brace in each support rib. The cross-brace can be surrounded by an outer surface of the support rib. In some embodiments, the outer support surface of each formed rib can define two or more corners. In some embodiments, each of the formed ribs is substantially similar. Substantially similar support ribs can be, in some embodiments, identical with the exception of minor manufacturing imperfections. Substantially similar support ribs will have the same shape and substantially equal dimensions. Support ribs can be formed 1020 consistently with approaches described earlier herein.

The support ribs can be coupled to the elongate brace 1030 via an interference fit. Each of the plurality of support ribs can be coupled to the elongate brace 1030 at incremental intervals along the length of the elongate brace. In some embodiments, coupling the plurality of support ribs to the elongate brace 1030 includes adhering each of the support ribs to the elongate brace. Adhering can include the use of glues, cements, chemical adhesives, hot-melt adhesives, and other adhesives. Adhering can also include welding or otherwise bonding to couple the support rib to the elongate brace 1030. The method of coupling the support ribs to the elongate brace 1030 can be otherwise consistent with connectors of the support ribs described above with reference to FIGS. 2-4E.

Wrapping pleated filter media around the support ribs 1040 forms an elongate tubular structure. The elongate tubular structure generally extends from a first end to a second end. The elongate tubular structure defines an inner passageway. In some embodiments of the current method, the filter media is pleated to form the pleated filter media that is wrapped around the support ribs. The pleated filter media can be consistent with the pleated filter medias described above with reference to FIGS. 1-4A.

In some examples, a first end cap is coupled to the pleated filter media at the first end. In such examples, the elongate brace can be coupled to the first end cap. In some examples, a second end cap is coupled to the pleated filter media at the second end. In such examples, the elongate brace can be uncoupled from the second end cap. Example end caps will be described with respect to FIGS. 6-7 and 13-14.

Figure 6:
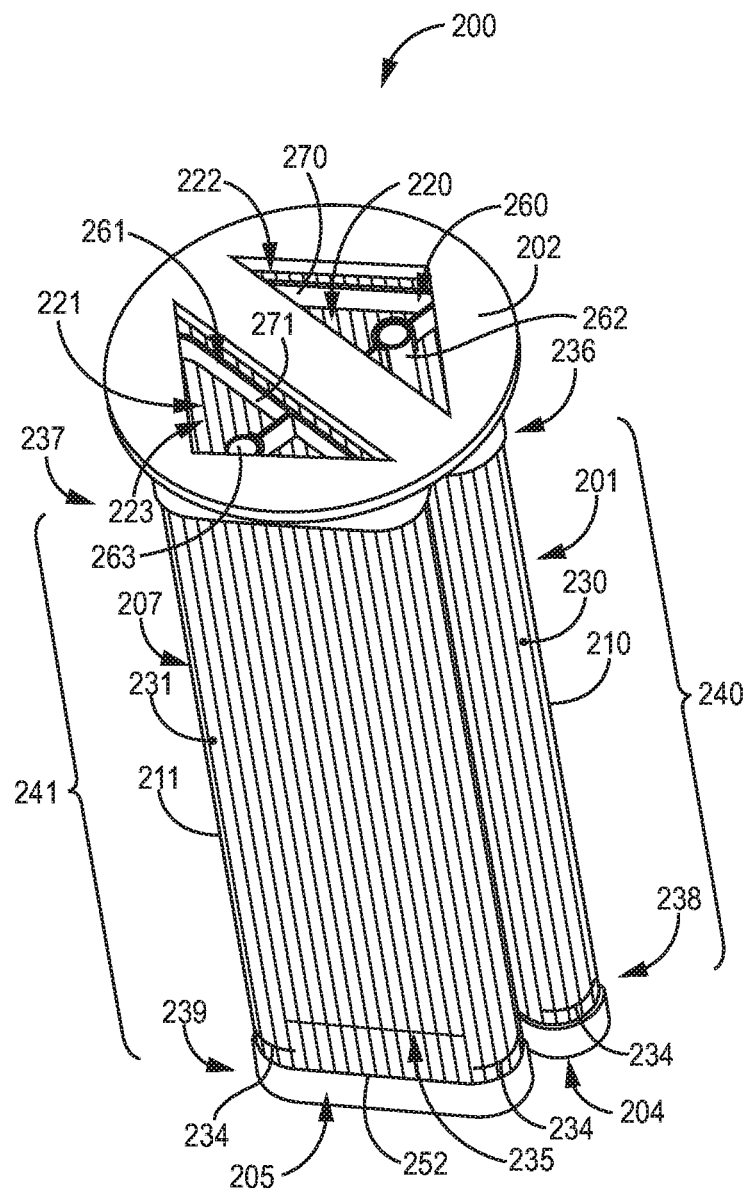
FIG. 6 is an example fluid filter assembly consistent with the technology disclosed herein.
Figure 7:
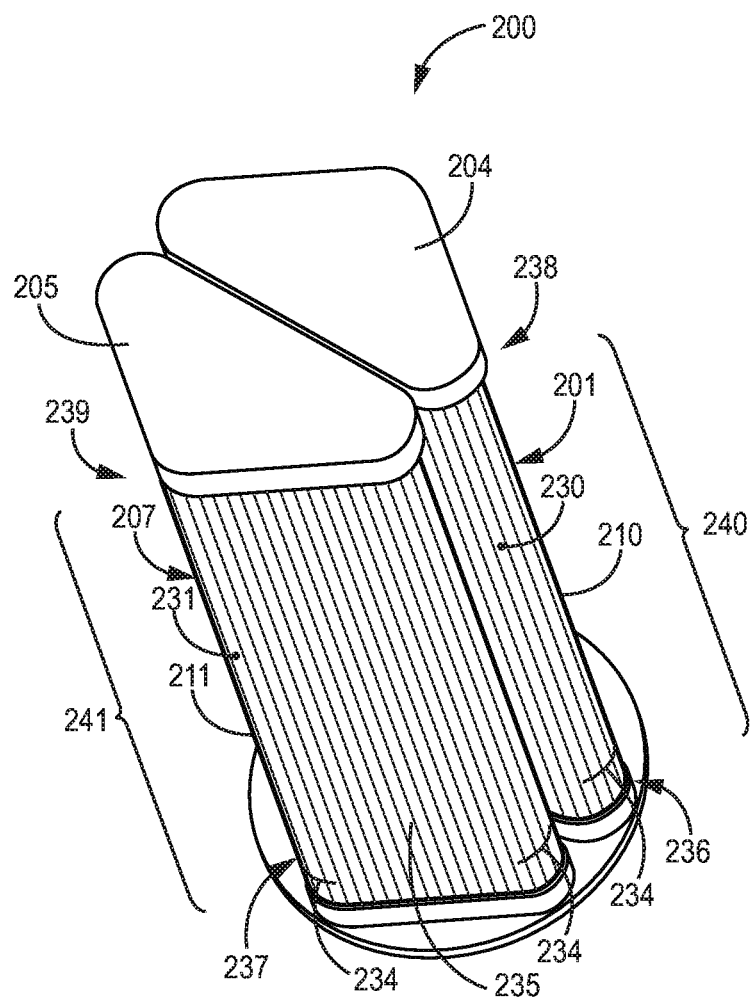
FIG. 7 is another view of the fluid filter assembly of FIG. 5.

FIGS. 6 and 7 depict an example implementation of filter elements such as those described in association with FIGS. 1-5. A fluid filter assembly 200 is generally configured to provide gas or liquid filtration, as described above with reference to FIG. 1. The fluid filter assembly 200 has a first filter element 201, a second filter element 207, a first end cap 202, a second end cap 204, and a third end cap 205.

The fluid filter assembly 200 is generally configured to be received by a filter receptacle in a filtration system. The fluid filter assembly 200 provides an increased filtration surface area as compared to some existing filter assemblies that are also configured to be received by the filter receptacle of the filtration system. Providing an increased filtration surface area can enable the fluid filter assembly 200 to handle a higher fluid flow rate for a given pressure. The increased filtration surface area can also enable the fluid filter assembly 200 to operate at a lower pressure for a given fluid flow rate. The increased filtration surface area can further allow increased intervals between servicing or replacing the fluid filter assembly 200.

The first filter element 201 has a first elongate tubular structure 210 defined by a first pleated filter media 230. The first elongate tubular structure 210 can be constructed in accordance with the tubular structures described earlier herein. The first elongate tubular structure 210 is a tubular structure with two or more faces 235 and two or more corners 234 defined by the first pleated filter media 230. The first elongate tubular structure 210 defines a first inner passageway 220. The first pleated filter media 230, and therefore the first elongate tubular structure 210 has a first end 236 and a second end 238. The first inner passageway 220 extends from the first end 236 to the second end 238 of the first pleated filter media 230. A first media length 240 is defined from the first end 236 to the second end 238 of the first pleated filter media 230.

The first pleated filter media 230 is generally consistent with the pleated filter media described above with reference to FIGS. 1-4E. The first pleated filter media 230 has inner pleat folds and outer pleat folds defining pleats. The pleats of the first pleated filter media 230 have pleat heights. In some embodiments, the first pleated filter media 230 defines pleats having substantially equal pleat heights.

In some examples, the first pleated filter media 230 is disposed on a first inner support structure 260. The first inner support structure 260 is a rigid structure configured to support the first pleated filter media 230. The first inner support structure 260 is disposed in the first elongate tubular structure 210. The first inner support structure 260 can be consistent with the inner support structures described above with reference to FIGS. 1-4E.

In some embodiments, the first inner support structure 260 has no more than one elongate brace 262 configured to support the first pleated filter media 230. The elongate brace 262 can extend between the first end 236 and the second end 238 of the first pleated filter media 230. The elongate brace 262 can be consistent with the elongate braces described above with reference to FIGS. 1-4A.

In some embodiments, first inner support structure 260 has a first plurality of support ribs 270. In such embodiments, the first support ribs 270 are coupled to the elongate brace 262. The first support ribs 270 can be consistent with the support ribs described above with reference to FIGS. 1-4E. For example, each of the first plurality of support ribs 270 can have a connector defining an interference-fit with the elongate brace 262.

The second filter element 207 has a second elongate tubular structure 211 defined by a second pleated filter media 231. The second elongate tubular structure 211 can be constructed in accordance with the tubular structures described earlier herein. The second elongate tubular structure 211 is a tubular structure with two or more faces 235 and two or more corners 234 defined by the second pleated filter media 231. The second elongate tubular structure 211 defines a second inner passageway 221. The second pleated filter media 231, and therefore the second elongate tubular structure 211, has a first end 237 and a second end 239. The second inner passageway 221 extends from the first end 237 to the second end 239 of the second pleated filter media 231. A second media length 241 is defined from the first end 237 to the second end 239 of the second pleated filter media 231. The second media length 241 is parallel to the first media length 240 in many embodiments.

The second pleated filter media 231 is generally consistent with the pleated filter medias described above with reference to FIGS. 1-4E. The second pleated filter media 231 has inner pleat folds and outer pleat folds defining pleats. The pleats of the second pleated filter media 231 have pleat heights. In some embodiments, the second pleated filter media 231 defines pleats having substantially equal pleat heights.

In some examples, the second pleated filter media 231 is disposed on a second inner support structure 261. The second inner support structure 261 is a rigid structure configured to support the second pleated filter media 231. The second inner support structure 261 is disposed in the second elongate tubular structure 211. The second inner support structure 261 can be consistent with the inner support structures described above with reference to FIGS. 1-4E.

In some embodiments, the second inner support structure 261 has no more than one elongate brace 263 configured to support the second pleated filter media 231. The elongate brace 263 can extend between the first end 237 and the second end 239 of the second pleated filter media 231. The elongate brace 263 can be consistent with the elongate braces described above with reference to FIGS. 1-4A.

In some embodiments, second inner support structure 261 has a second plurality of support ribs 271. In such embodiments, the second support ribs 271 are coupled to the elongate brace 263. The second support ribs 271 can be consistent with the support ribs described above with reference to FIGS. 1-4E. For example, each of the second plurality of support ribs 271 can have a connector defining an interference-fit with the elongate brace 263.

The filter assembly 200 is configured to be received by a cylindrical filter receptacle in some embodiments. The first and second filter elements 201 and 207 each generally have a filtration surface area through which fluid can pass and be filtered. The filtration surface area is an area of the pleated filter media 130 available for filtration, and includes the corners 234 and faces 235 of the first and second pleated filter medias 230 and 231. The combined filtration surface area of the first filter element 201 and the second filter element 207 is greater than a filtration surface area of many cylindrical tubular filter assemblies that are configured to be received by a cylindrical filter receptacle.

The first and second filter elements 201 and 207 are generally arranged such that a portion of the filtration surface area of the first filter element 201 is adjacent to a portion of the filtration surface area of the second filter element 207. As applied to the two filter elements, the phrase "adjacent to" used herein refers to an orientation in which the filtration surface areas are proximate, but generally not making contact. In some embodiments, the adjacent filtration surface areas are generally parallel to each other. The first and second filter elements 201 and 207 generally adjacent to each other such that there is a distance between the two filter elements defining a fluid flow path in the region between the two filter elements to enable fluid filtration through the adjacent filtration surface areas. In some embodiments, the first and second filter elements 201 and 207 substantially mirror each other. In some embodiments, the fluid filter assembly 200 has one or more structures that define fluid flow paths through the fluid filter assembly 200, such as one or more end caps. End caps are generally coupled at the ends of the first and second filter elements 201 and 207. In some examples, an end cap forms a barrier to fluid flow, such as blocking the inner passageway. In some examples, an end cap defines a flow path there-through, thereby allowing fluid communication between an inner passageway and an external volume. In some embodiments, a tubular structure of a filter element is configured to have one open end and one closed end that is defined by respective end caps. In such embodiments, the filter element 200 is configured to direct fluid to flow through the first or second end and through the filter media of the tubular structure.

The first end cap 202 (particularly visible in FIG. 6) is configured to allow fluid to flow between an external source or sink and each of the first inner passageway 220 of the first filter element 201 and the second inner passageway 221 of the second filter element 207. The first end cap 202 is coupled to the first end 236 of the first pleated filter media 230 and the first end 237 of the second pleated filter media 231. The first end cap 202 defines a first opening 222 in communication with the first inner passageway 220 and a second opening 223 in communication with the second inner passageway 221.

The second end cap 204 (particularly visible in FIG. 7) is coupled to the second end 138 of the first elongate tubular structure 210. The second end cap 204 forms a barrier across the first inner passageway 220. The third end cap 205 is coupled to the second end 239 of the second elongate tubular structure 211. The third end cap 205 forms a barrier across the second inner passageway 221. In some embodiments, a single end cap can couple to both the second end 238 of the first elongate tubular structure 210 and the second end 239 of the second elongate tubular structure 211 to form a barrier across both the first inner passageway 220 and the second inner passageway 221.

The first and second pleated filter medias 230 and 231 are configured to allow fluid flow there through. In some examples, fluid flows through the first pleated filter media 230 into the first inner passageway 220 and out of the fluid filter assembly 200 through the first opening 222 in the first end cap 202, and fluid flows through the second pleated filter media 231 into the second inner passageway 221 and out through the second opening 223 in the first end cap 202. In other examples, fluid flows through the first pleated filter media 230 and the second pleated filter media 231 in the opposite direction.

Figure 8:
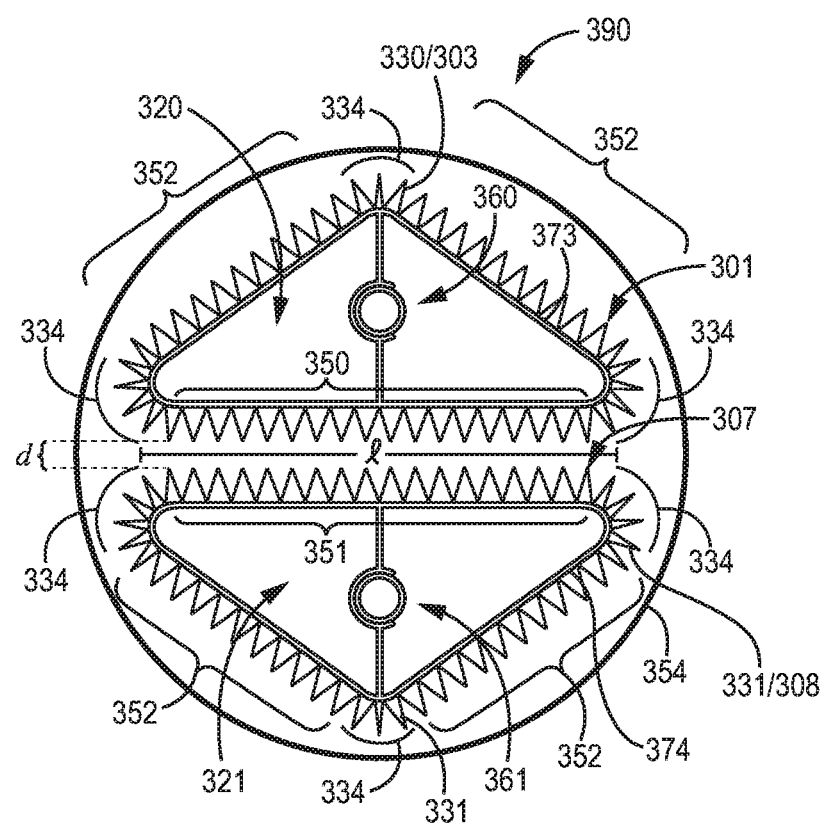
FIG. 8 is a schematic cross-sectional view of a fluid filter assembly consistent with the technology disclosed herein.

FIG. 8 is a schematic cross-sectional view of a filtration system 390, where the cross section is viewed from a direction perpendicular to a length of a filter media. The filtration system 390 is an example implementation of a fluid filter assembly 300 consistent with the fluid filter assemblies described above with reference to FIGS. 6-7. The fluid filter assembly 300 has a first filter element 301 and a second filter element 307 that can also be consistent with those described above.

In the filtration system 390, the fluid filter assembly 300 is disposed in a filter receptacle 354 generally defining a circular cross-section surrounding the fluid filter assembly 300. The fluid filter assembly 300 provides an increased filtration surface area compared to some existing cylindrical tubular pleated filter assemblies that are also configured to be received by the filter receptacle, which can have advantages such as those described above with reference to FIGS. 6-7.

The first filter element 301 has a first pleated filter media 330. The first pleated filter media 330 generally has a triangular cross-sectional shape in a direction perpendicular to a length of the first pleated filter media 330. As such, the cross section of the first pleated filter media 330 defines a first triangle 303. The first triangle 303 of the first pleated filter media 230 is generally each defined by three corners 334 and three sides 350, 352. The first triangle 303 is an isosceles triangle. The first triangle 303 has a longest side 350 two minor sides 352. The longest side 350 of the first triangle 303 has a length l that is greater than the length of each of the other two minor sides 352.

The second filter element 307 has a second pleated filter media 331. The second pleated filter media 331 generally has a triangular cross-sectional shape. As such, the cross section of the second pleated filter media 331 perpendicular to a length of media defines a second triangle 308. The second triangle 308 of the second pleated filter media 331 is generally each defined by three corners 334 and three sides 351, 352. The first triangle 303 is an isosceles triangle. The second triangle 308 has a longest side 351 and minor sides 352. The longest side 351 of the second triangle 308 has a length l that is greater than the length of the other two minor sides 352.

In some embodiments, the length l of the longest side 350 of the first triangle 303 is substantially equal to the length l of the longest side 351 of the second triangle 308, meaning that the length l of the longest side 350 of the first triangle 303 is within 10% of the length l of the longest side 351 of the second triangle 308. In some embodiments, the first and second triangles 303 and 308, like the first and second filter elements 301, 307 are substantially identical.

As discussed above, the first triangle 303 generally adjacent to the second triangle 308 such that a face of the first pleated filter media 330 is spaced a distance d away from a face of the second pleated filter media 331. In the current figure, the adjacent faces correspond to the longest side 350 of the first triangle 303 and the longest side 351 of the second triangle 308. In particular, the first and second triangles 303 and 308 are arranged such that the longest side 350 of the first triangle 303 is parallel to the longest side 351 of the second triangle 308. In some examples, the length of the longest side 350 of the first triangle 303 and the longest side 351 of the second triangle 308 are each no more than 10% less than another inner dimension of the filter receptacle that is configured to accommodate the longest side 350. For example, a filter receptacle can have a generally rectangular cross-sectional shape, wherein the dimension of the filter receptacle configured to accommodate the element is the length between opposite corners. Other filter receptacle shapes are contemplated.

The first triangle 303 and the second triangle 308 are generally arranged in the fluid filter assembly 300 such that the filtration surface area of the first pleated filter media 330 and the second pleated filter media 331 are increased for the given filter receptacle 354 relative to a filter element having a pleated filter media configuration forming a single tubular cylinder. This relative increase in filtration surface area can be represented by a ratio of the total linear length of the sides and corners of the first and second triangles 303 and 308 relative to the open cross-sectional area of the filter receptacle. In some embodiments, a ratio of the total length of the sides of the first filter element 301 and the second filter element 307 to an open cross-sectional area of a circle encompassing the first triangle and the second triangle is greater than 0 and less than 10.

The first filter element 301 and the second filter element 307 have similar configurations to that described in previous figures. The first filter element 301 can have a first tubular structure (such as is visible in FIG. 1) defined by the first pleated filter media 330. The first filter element 301 has a first inner support structure 360 disposed within a first inner passageway 320 of the first tubular structure. The first inner support structure 360 can be consistent with the inner support structures described previously herein. The first inner support structure 360 generally has a first outer support surface 373. The first inner support structure 360 defines a shape to which the first pleated filter media 330 conforms. The first inner support structure 360 maintains the triangular cross-sectional shape of the first pleated filter media 330. In some embodiments, the first outer support surface 373 abuts a substantial portion of the inner pleat folds of the first pleated filter media 330. In some embodiments, the first inner support structure 360 at least partially defines the first inner passageway 320.

The second filter element 307 can have a second tubular structure (such as is visible in FIG. 1) defined by the second pleated filter media 331. The second tubular structure defines a second inner passageway 321. The second filter element 307 has a second inner support structure 361 disposed within the second inner passageway 321. The second inner support structure 361 generally has a second outer support surface 374. The second inner support structure 361 defines a shape to which the second pleated filter media 331 conforms. The second inner support structure 361 maintains the triangular cross-sectional shape of the second pleated filter media 331. In some embodiments, the second outer support surface 374 abuts a substantial portion of the inner pleat folds of the second pleated filter media 331. In some embodiments, the second inner support structure 361 at least partially defines the second inner passageway 321.

Figure 9:
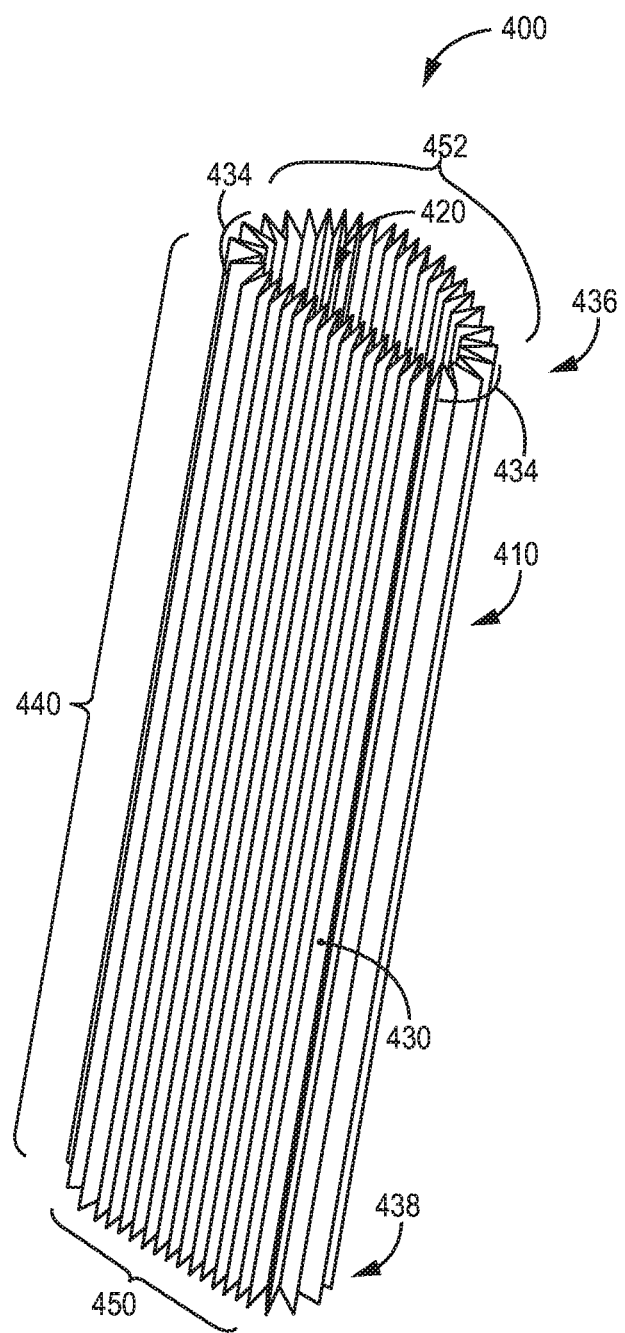
FIG. 9 is a perspective view of another example filter element consistent with the technology disclosed herein.
Figure 10:
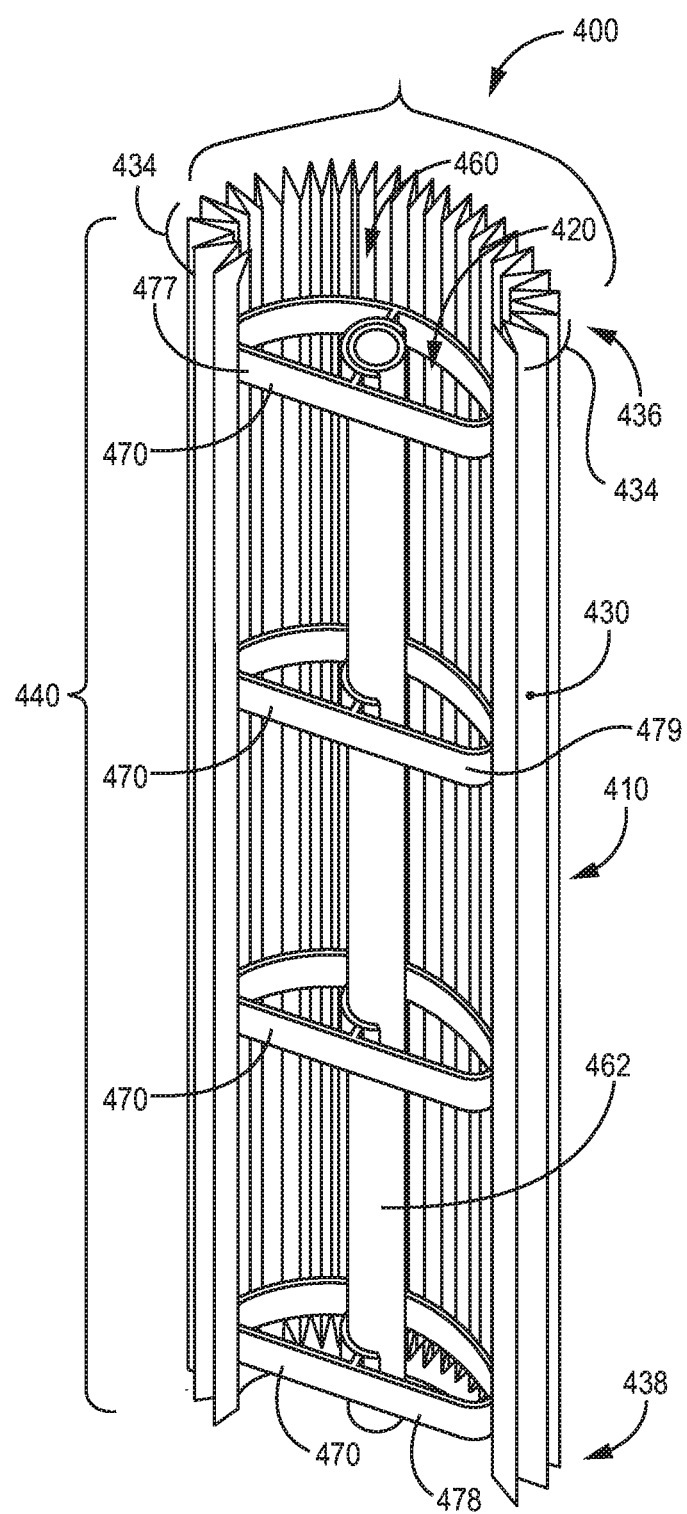
FIG. 10 is a cutaway view of the filter element of FIG. 9.

FIG. 9 depicts another example filter element 400 consistent with some example embodiments and FIG. 10 is a cutaway view of the filter element 400 depicted in FIG. 9. The filter element 400 generally has a pleated filter media 430 disposed around an inner support structure 460. The inner support structure 460 is also visible in FIG. 11. The filter element 400 is configured in an elongate tubular structure 410 defining an inner passageway 420, and the inner support structure 460 is disposed within the inner passageway 420. The pleated filter media 430 is generally consistent with pleated filter media already described herein. For example, the pleated filter media has outer pleat folds and inner pleat folds each extending from a first end 436 to a second end 438 of the pleated filter media 430. The inner passageway 420 extends from the first end 436 to the second end 438 of the pleated filter media 430.

In embodiments consistent with the current figures, the pleated filter media 430 of the filter element 400 defines two corners 434 that joins a relatively flat face 450 to a substantially curved face 452 resulting in a "D" cross sectional shape (described below in the discussion of FIG. 12A). The corners 434 are substantially curved planes.

The inner support structure 460 is configured to maintain the shape of the pleated filter media 430 and is generally consistent with inner support structures already described herein. For example, the inner support structure 460 has no more than one elongate brace 462 and a plurality of support ribs 470 coupled to the elongate brace 462. The elongate brace 462 extends between the first end 436 and the second end 438 of the pleated filter media 430. The inner support structure 460 generally has an outer support surface 473 that defines the cross-sectional shape of the inner passageway 420. The elongate brace 462 can have alternate configurations that have already been described herein.

The support ribs 470 are coupled to the elongate brace 462 at incremental intervals along the length of the elongate brace 462. Each of the support ribs 470 can be substantially identical. Each of the support ribs 470 at least partially defines the inner passageway 420 and has a connector 472 defining an interference-fit with the elongate brace 462, although alternate or additional connections can be used which have already been described. The support ribs 470 define the outer support surface 473 of the inner support structure 460, where the outer support surface 473 abuts a substantial portion of the inner pleat folds of the pleated filter media 430. The support ribs 470 can be characterized as having at least a first support rib 477 disposed towards the first end 436 of the elongate tubular structure of the pleated filter media 430, a second support rib 478 disposed towards the second end 438 of the elongate tubular structure, and a third support rib 479 disposed between the first support rib 477 and the second support rib 478.

As has been described, one or more end caps (not currently depicted) can be coupled to the filter element 400 to direct fluid flow through the pleated filter media 430.

The current example filter element 400 of FIGS. 9-11 has pleated filter media 430 and support ribs 470 having a cross-sectional shape distinguishable from those of corresponding components described with reference to FIGS. 1-8.

Figure 11:
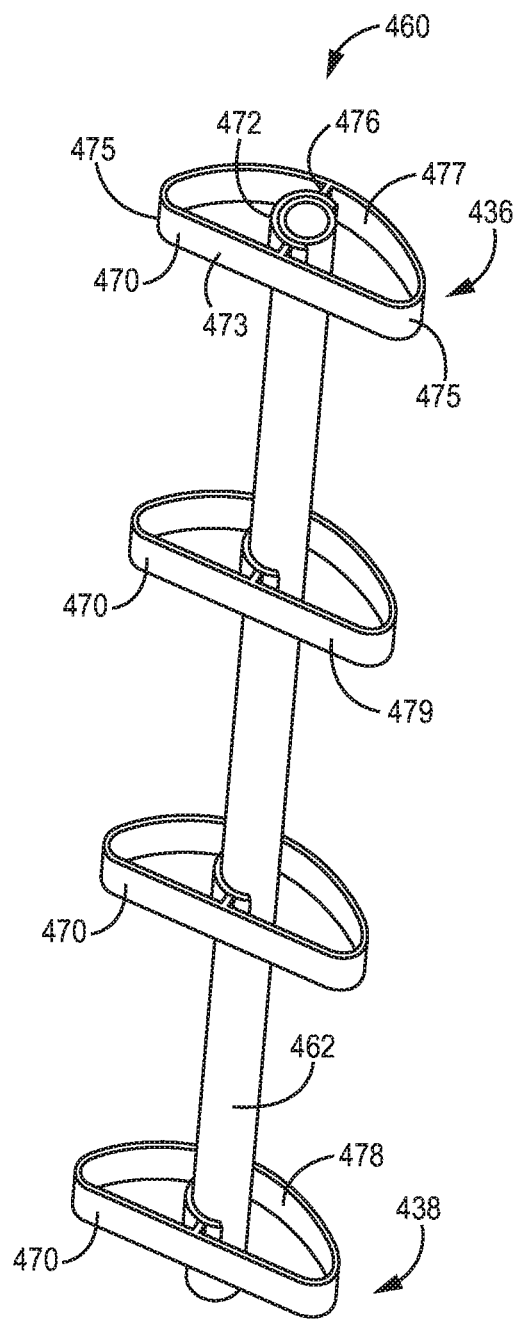
FIG. 11 is an inner support structure of the filter element of FIG. 9.
Figure 12A:
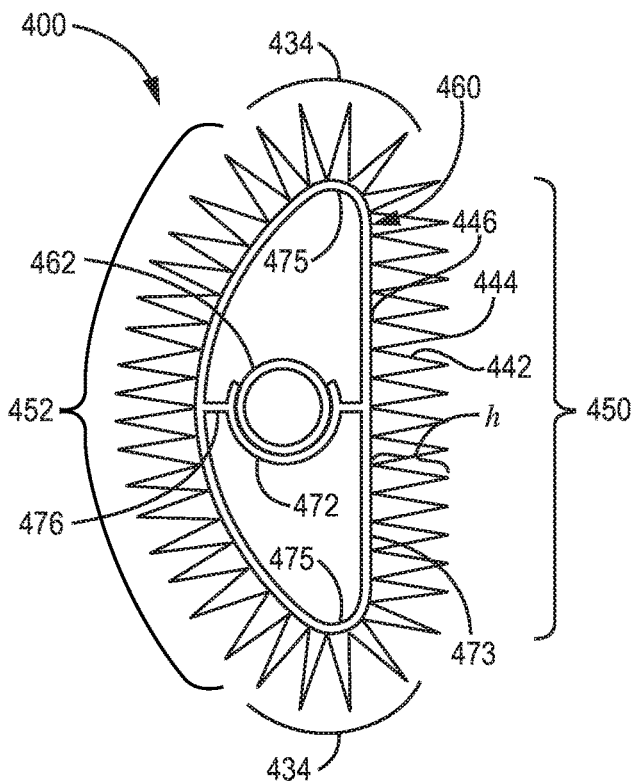
FIG. 12A is a cross-sectional view of the filter element of FIG. 9.

FIG. 12A is a cross-sectional view of the filter element 400 of FIGS. 9-11, where the cross section is viewed from a direction perpendicular to the length 440 of the pleated filter media 430. The pleated filter media 430 is disposed around the inner support structure 460. The pleated filter media 430 is generally supported by the outer support surface 473 of the support ribs 470 of the inner support structure 460. The pleated filter media 430 has pleats 442 defined by outer pleat folds 444 and inner pleat folds 446. In a variety of embodiments, a substantial portion of the pleats have substantially equal pleat heights.

Generally, the cross-sectional shape of the pleated filter media 430 defines two or more corners 434. Generally, the outer support surface 473 of the support rib abuts the inner pleat folds 446 around each corner 434. In this particular example, the cross-sectional shape of the pleated filter media 430 defines two corners 434, a substantially arced segment 452 (corresponding to the curved plane 452 visible in FIGS. 9 and 10) coupled to a linear segment 450 (corresponding to the relatively flat plane 450 visible in FIGS. 9 and 10) at the corners 434. In some examples, the substantially arced segment is configured to be concentric with an inner surface of a filter receptacle. Similar to the phrase "substantially curved plane," the phrase "substantially arced segment" is defined herein to encompass an arcuate section but also a section having multiple facets that approximate the shape of an arc.

Figure 12B:
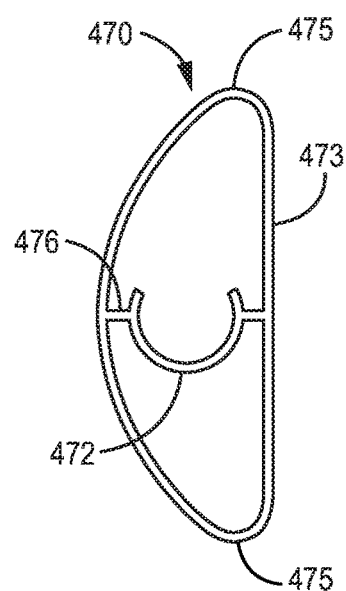
FIG. 12B is a cross-sectional view of a support rib of the filter element of FIG. 9.

FIG. 12B is a cross-sectional view of the example support rib 470 of the filter element 400 of FIGS. 9-12A, where the cross section is viewed from a direction perpendicular to the length of the pleated filter media 430. Each of the support ribs 470 generally has an outer support surface 473, a cross-brace 476, and a connector 472. The outer support surface 473 defines two or more corners 475. The cross-brace 476 is surrounded by an outer surface of the support rib 470. Here, the cross-brace 476 is surrounded by the outer support surface 473 of the support rib 470. Also, in the current embodiment, the connector 472 can be described as defining a portion of the cross-brace 476.

Figure 12C:
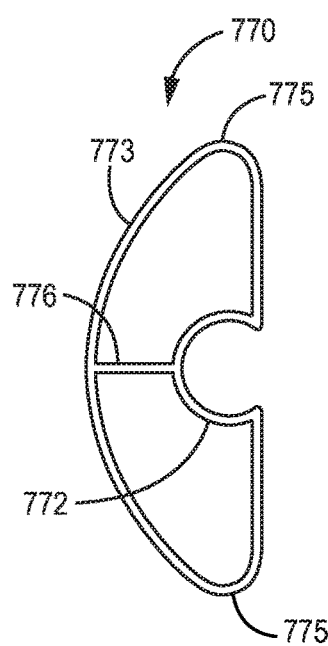
FIG. 12C is a cross-sectional view of a support rib consistent with the technology disclosed herein.

FIG. 12C depicts an alternate example support rib 770 consistent with some embodiments. The support rib 770 has an outer support surface 773, a cross-brace 776, and a connector 772. The outer support surface 773 defines two or more corners 775. The connector 772 is defined by a recess in the outer support surface 773 such that the connector 772 is only partially surrounded by the outer support surface 773. Here, while the cross-brace 776 is surrounded by an outer surface of the support rib 770, the cross-brace 776 is only partially surrounded by the outer support surface 773 of the support rib 770. Described differently, here the cross-brace 776 is surrounded by the outer support surface 773 of the support rib 770 and the connector 772.

While FIGS. 12B and 12C depict two examples of support ribs, it will be appreciated that alternative configurations of support ribs are possible. It may be desirable to have an outer support surface having alternate shapes to retain corresponding cross-sectional shapes from the filter media. Also, it may be desirable to incorporate additional cross-braces. It also may be desirable to have support ribs that have connectors with alternate configurations, as has been described.

Figure 13:
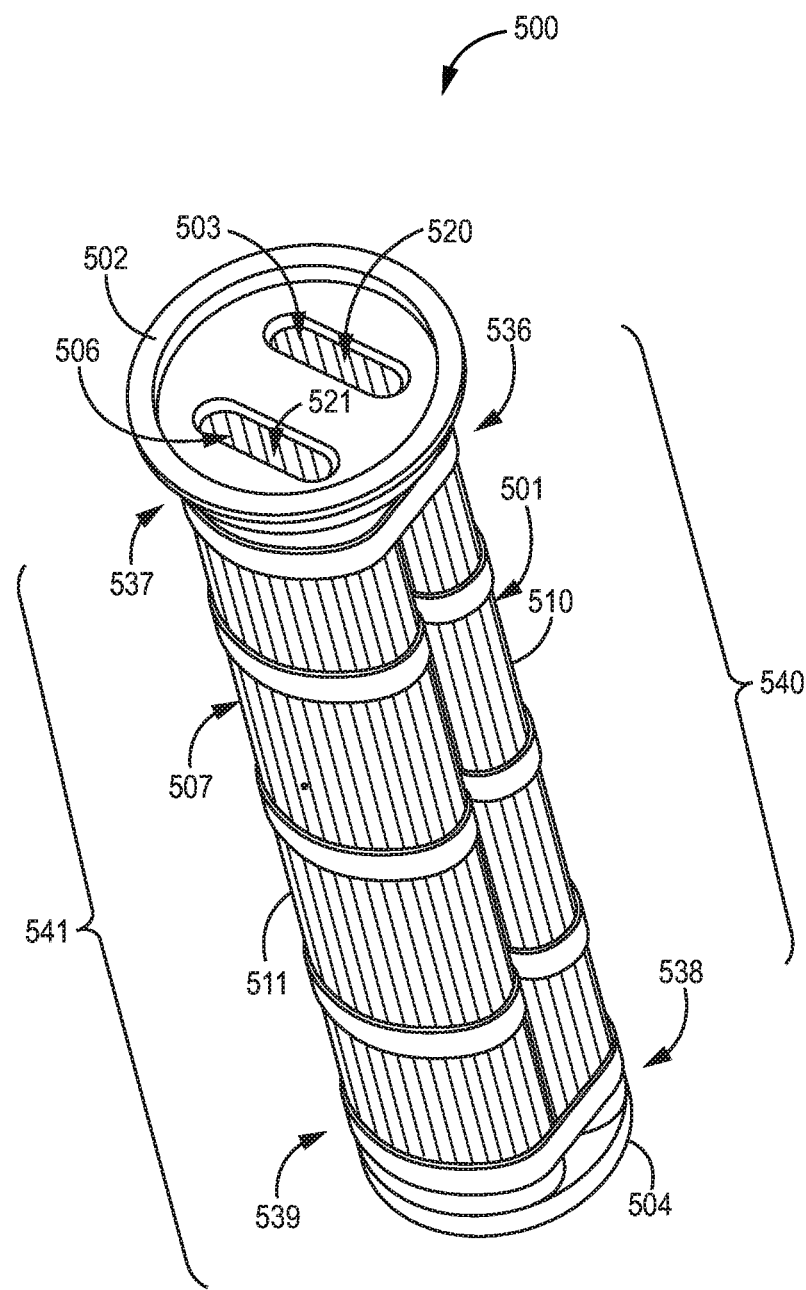
FIG. 13 is a perspective view of another example fluid filter assembly consistent with the technology disclosed herein.
Figure 14:
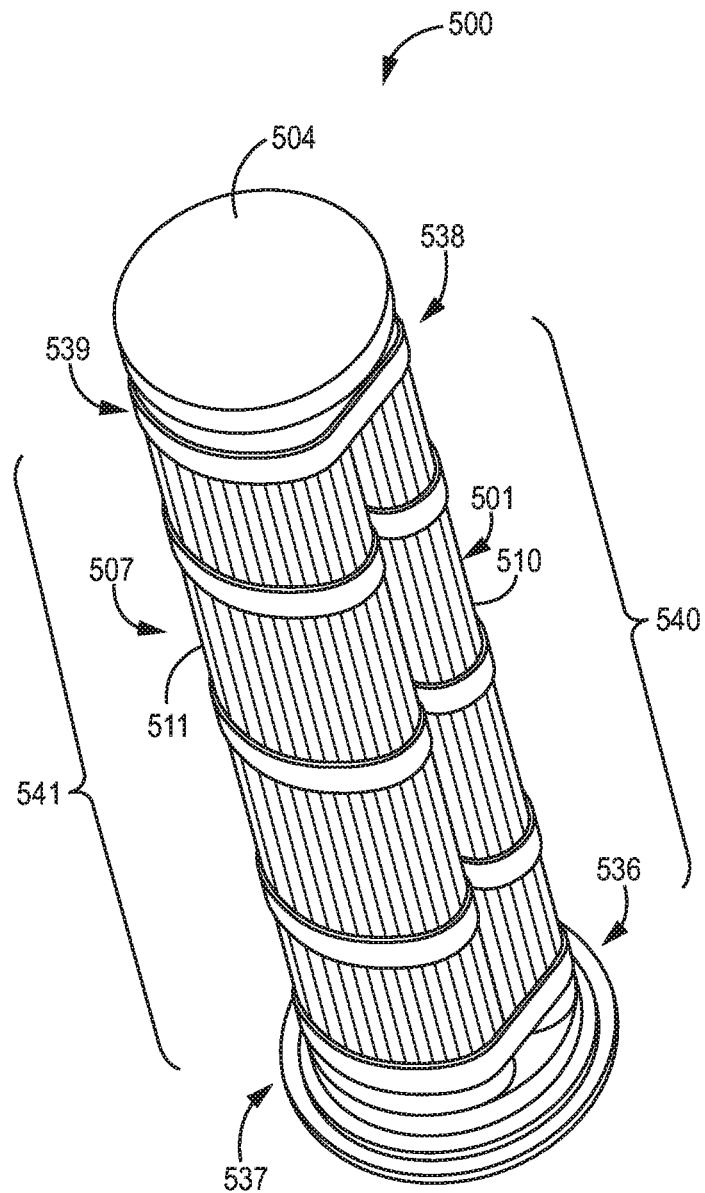
FIG. 14 is another view of the fluid filter assembly of FIG. 12.

FIGS. 13 and 14 depict an example implementation of a filter element. A fluid filter assembly 500 has a first filter element 501, a second filter element 507, a first end cap 502 and a second end cap 504. The first filter element 501 and the second filter element 507 are generally consistent with the filter element described in association with FIGS. 9-12A.

The first filter element 501 has filter media 510 defining a first tubular structure having a first inner passageway 520 extending from a first end 536 to a second end 538 of the first pleated filter media 510 to define a first media length 540. The second filter element 507 has second pleated filter media 511 defines a second tubular structure having a second inner passageway 521 extending from a first end 537 to a second end 539 of the second pleated filter media 511 to define a second media length 541. The first media length 540 and the second media length 541 are parallel in many embodiments. A first inner support structure is disposed within the first pleated filter media 510 and a second inner support structure is disposed within the second pleated filter media 511, although they are not currently visible (see for example, FIG. 11). The cross section of the first pleated filter media 510 perpendicular to the first media length 540 and the cross section of the second pleated filter media 511 media perpendicular the second media length 541 is consistent with that described in association with FIG. 12A.

The first end cap 502 is coupled to the first end 536 of the first pleated filter media 510 and the first end 537 of the second pleated filter media 511. The first end cap 502 defines a first opening 503 in communication with the first inner passageway 520 and a second opening 506 in communication with the second inner passageway 521. The second end cap 504 is coupled to the second end 538 of the first pleated filter media 510 and the second end 539 of the second pleated filter media 511. The second end cap 504 defines a barrier across the inner passageways 520, 521. In some embodiments it can be desirable to use two end caps instead of the second end cap 504 to define a barrier across the inner passageways 520, 521, similar to the embodiment depicted in FIG. 7.

Figure 15:
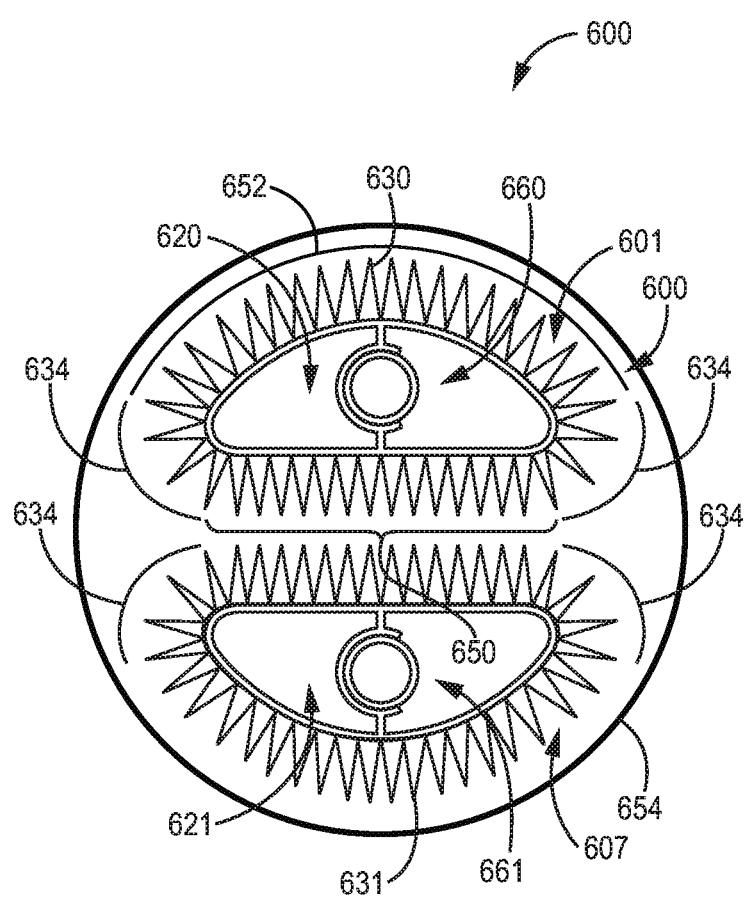
FIG. 15 is a schematic cross-sectional view of a fluid filter assembly consistent with the technology disclosed herein.

FIG. 15 is a cross-sectional view of a filtration system. The filtration system depicts a fluid filter assembly 600 disposed in a filter receptacle 654. The fluid filter assembly 600 generally has a first filter element 601 having first pleated filter media 630 and a second filter element 607 having second pleated filter media 631. The fluid filter assembly 600 can be consistent with the fluid filter assembly 500 discussed above with respect to FIGS. 13-14. The cross section is in the direction perpendicular to the length of the first pleated filter media 630 and the second pleated filter media 631.

Similar to the embodiment depicted in FIG. 8, here the filter receptacle 654 generally defines a circular cross section that is configured to accommodate a fluid filter assembly 600. The fluid filter assembly 600 provides an increased filtration surface area compared to some existing cylindrical tubular pleated filter assemblies that are also configured to be received by the filter receptacle 654.

Each of the first filter element 601 and the second filter element 607 is generally consistent with the filter element described and depicted in FIG. 12A. The first filter element 601 has first filter media 630 and a first inner support structure 660 that mutually define a first inner passageway 620. The second filter element 607 has a second filter media 631 and a second inner support structure 661 that mutually define a second inner passageway 621. The first pleated filter media 630 in the first filter element 601 and the second pleated filter media 631 in the second filter element 607 each define corners 634 joining a linear segment 650 to a substantially arced segment 652. The linear segment 650 of the first pleated filter media 630 is adjacent to, albeit spaced from, the linear segment 650 of the second pleated filter media 631. The linear segment 650 of the first pleated filter media 630 is parallel to the linear segment 650 of the second pleated filter media 631.

In some embodiments, the substantially arced segment 652 of the first pleated filter media 630 and the substantially arced segment 652 of the second pleated filter media 631 are each configured to be concentric with the inner surface of the filter receptacle 654.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A filter element comprising:
   pleated filter media defining an elongate tubular structure having an inner passageway, the pleated filter media having outer pleat folds and inner pleat folds each extending from a first end to a second end of the elongate tubular structure;
   no more than one elongate brace disposed in the inner passageway, wherein the elongate brace extends between the first end and the second end; and
   a plurality of support ribs coupled to the elongate brace, wherein each support rib has a connector defining an interference-fit with the elongate brace, wherein each support rib partially defines the inner passageway.

2. The filter element of claim 1, wherein the inner passageway extends from the first end to the second end of the pleated filter media to define a media length.

3. The filter element of claim 1, wherein an inner support structure comprises the elongate brace and the plurality of support ribs and wherein the inner support structure defines a cross-sectional shape of the inner passageway perpendicular to the media length.

4. The filter element of claim 1, wherein each support rib has an outer support surface that abuts a substantial portion of the inner pleat folds.

5. The filter element of claim 1, wherein each of the support ribs comprises a cross-brace, wherein the cross-brace is surrounded by an outer surface of the support rib.

6. The filter element of claim 1, wherein the cross-brace is surrounded by the outer support surface of the support rib and the connector.

7. The filter element of claim 1, wherein the connector defines a portion of the cross-brace.

8. The filter element of claim 1, wherein a cross-sectional shape of the pleated filter media perpendicular to the media length defines two or more corners and the outer support surface of the support rib abuts the inner pleat folds around each corner.

9. The filter element of claim 1, wherein the cross-sectional shape of the pleated filter media is a substantially arced segment coupled to a linear segment at the corners.

10. The filter element of claim 9, wherein the substantially arced segment is configured to be concentric with an inner surface of a filter receptacle.

11. The filter element of claim 1, wherein the cross-sectional shape of the pleated filter media is a triangle.

12. The filter element of claim 11, wherein the triangle has one longest side having a length that is greater than the length of each of the other two sides.

13. The filter element of claim 1, wherein the cross-sectional shape of the pleated filter media is a right triangle.

14. The filter element of claim 1, wherein the elongate brace is a tube.

15. The filter element of claim 1, wherein the elongate brace is a rod.

16. The filter element of claim 1, wherein the plurality of support ribs comprises a first support rib disposed towards the first end of the elongate tubular structure, a second support rib disposed towards the second end of the elongate tubular structure, and a third support rib disposed between the first support rib and the second support rib.

17. The filter element of claim 1, wherein each of the support ribs is substantially similar.

18. The filter element of claim 1, wherein the inner pleat folds and the outer pleat folds define pleats and wherein all of the pleats of the pleated filter media have pleat heights that are substantially equal.

19. The filter element of claim 1, wherein the inner pleat folds and the outer pleat folds define pleats and wherein a substantial portion of the pleats in the pleated filter media have substantially equal pleat heights.

20. The filter element of claim 1, further comprising a first end cap coupled to the first end of the pleated filter media and a second end cap coupled to the second end of the pleated filter media, wherein the first end cap defines an opening in communication with the inner passageway and the second end cap forms a barrier across the inner passageway.

* * * * *